United States Patent [19]
Uchida

[11] Patent Number: 5,774,675
[45] Date of Patent: Jun. 30, 1998

[54] HEADER CONVERTING METHOD

[75] Inventor: Yoshihiro Uchida, Kanagawa, Japan

[73] Assignee: Fujitsu Limited, Kanagawa, Japan

[21] Appl. No.: 644,392

[22] Filed: May 8, 1996

[30]     Foreign Application Priority Data

May 8, 1995   [JP]   Japan ................................. 7-109754

[51] Int. Cl.⁶ ........................... G06F 13/14; G06F 13/38; H04L 12/28
[52] U.S. Cl. ............................... 395/200.76; 395/200.66; 370/395
[58] Field of Search ....................... 395/200.01, 200.15, 395/200.09, 200.11, 200.16, 800, 728, 505, 200.76, 200.79, 200.66; 370/398, 248, 399, 219, 358, 409, 233, 234, 218, 397, 390, 395, 250; 340/825.21; 364/DIG. 1, DIG. 2; 348/17, 441, 15, 19

[56]           References Cited

U.S. PATENT DOCUMENTS

| | | | |
|---|---|---|---|
| 4,491,945 | 1/1985 | Turner ..................................... | 370/409 |
| 4,492,230 | 1/1985 | Turner ..................................... | 370/409 |
| 4,956,839 | 9/1990 | Torii et al. ............................... | 370/232 |
| 5,070,498 | 12/1991 | Kukuma et al. ......................... | 370/233 |
| 5,153,578 | 10/1992 | Izawa et al. ....................... | 340/325.21 |
| 5,191,577 | 3/1993 | Uchida et al. ........................... | 370/388 |
| 5,193,088 | 3/1993 | Choi et al. ............................... | 370/398 |
| 5,239,539 | 8/1993 | Uchida et al. ........................... | 370/398 |
| 5,299,209 | 3/1994 | Murayama et al. ..................... | 370/219 |
| 5,301,184 | 4/1994 | Uriu et al. ............................... | 370/219 |
| 5,313,453 | 5/1994 | Uchida et al. ........................... | 370/248 |
| 5,448,720 | 9/1995 | Uriu et al. ............................... | 395/728 |
| 5,610,913 | 3/1997 | Tomonaga et al. ..................... | 370/219 |
| 5,638,360 | 6/1997 | Sugawara ................................ | 370/253 |

*Primary Examiner*—Daniel H. Pan
*Attorney, Agent, or Firm*—Helfgott & Karas, P.C.

[57]           ABSTRACT

An ATM switch accommodates a plurality of input lines. Conversion controlling units are disposed corresponding to the input lines. Each of the conversion controlling units analyzes a header of a cell received through the relevant input line and accesses a common conversion table corresponding to routing information included in the header. The common conversion table is disposed in common with the input lines. The common conversion table collates routing information of cells received through the input lines with output routing information and stores the collated data. Each of the conversion controlling units extracts output routing information from the common conversion table corresponding to the routing information of a cell received through the relevant input line, adds output routing information to the header of the cell, and sends the resultant cell to the ATM switch.

25 Claims, 26 Drawing Sheets

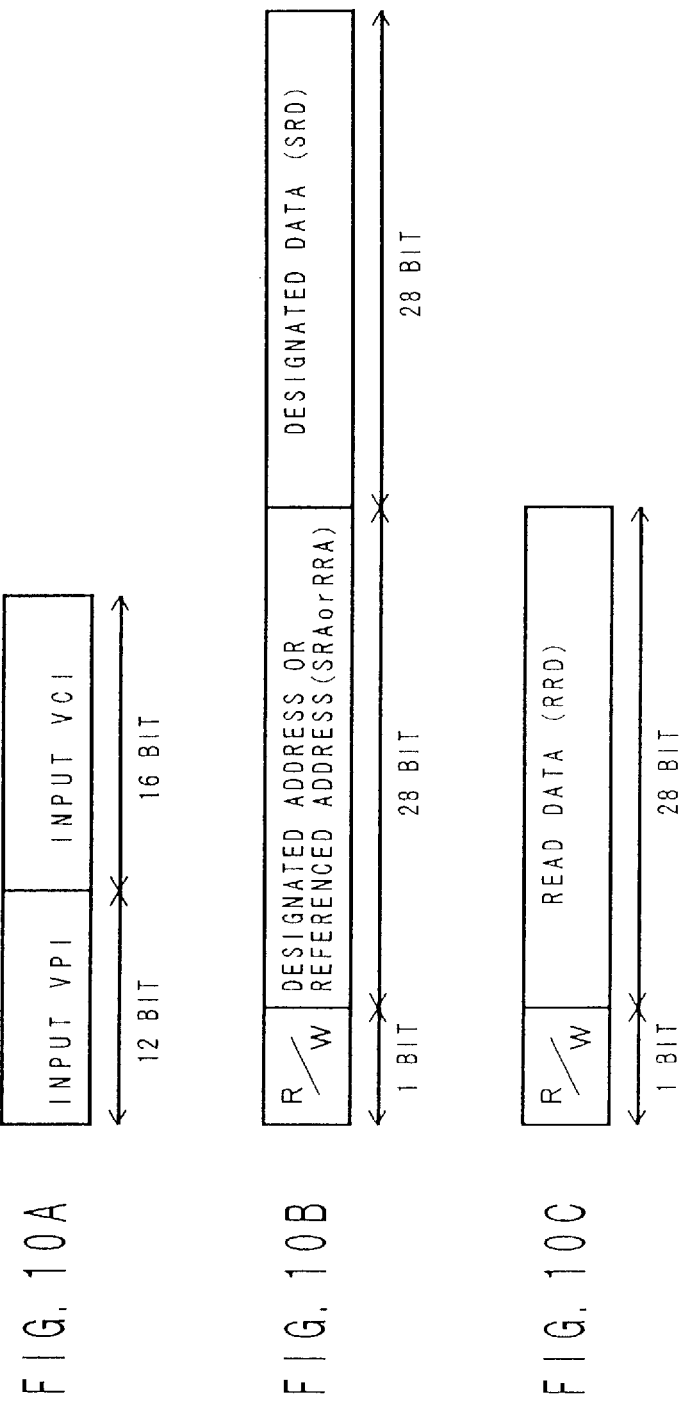

| R/W | INPUT VPI / VCI | DON'T CARE | LINE NUMBER |

FIG. 12A

| R/W | DESIGNATED ADDRESS OR REFERENCE ADDRESS | DESIGNATED DATA | LINE NUMBER |

FIG. 12B

| READ DATA | LINE NUMBER |

FIG. 12C

| ADDRESS | | | DATA | |
|---|---|---|---|---|
| BINARY | | HEX | | |
| 000 | 00000 | 0 | | |
| 000 | 00001 | 1 | | BLOCK 0 |
| 000 | 00010 | 2 | | (FOR #0) |
| ... | ... | ... | | |
| 000 | 11110 | 1E | | |
| 000 | 11111 | 1F | | |
| 001 | 00000 | 20 | | |
| 001 | 00001 | 21 | | BLOCK 1 |
| ... | ... | ... | | (FOR #1) |
| 001 | 11111 | 3F | | |
| 010 | 00000 | 40 | | |
| 010 | 00001 | 41 | | BLOCK 2 |
| 010 | 00010 | 42 | | (FOR #2) |

FIG. 15A

| DATA | | | | |
|---|---|---|---|---|
| SET BIT | INPUT HEADER INFORMATION | | CONVERSION INFORMATION (OUTPUT HEADER INFORMATION) | |
| | INPUT VPI | INPUT VCI | INTERNAL VPI | INTERNAL VCI |
| z | xxxxxxxxxxxx | yyyyyyyyyyyyyyyy | xxxxxxxxxxxx | yyyyyyyyyyyyyyyy |
| : | : | : | : | : |
| | | | | |
| 1 | 12 | 16 | 12 | 16 |

FIG. 15B

TABLE 72

| BLOCK 0 | ..... | BLOCK 8 | BLOCK 9 | ... | BLOCK 15 |

INDEX TABLE (MEMORY 76)

| CARD | BLOCK NUMBER |
|---|---|
| #0 | 0000001100000001 |
| 1 | 0000000000000010 |
| 2 | 0000000000000100 |
| 3 | 0000000000001000 |
| 4 | 0000000100010000 |
| 5 | 0000000000100000 |
| 6 | 0000000001000000 |
| 7 | 0000000010000000 |

FIG. 16

| CAM (MEMORY 76) | | | TABLE 72 | |
|---|---|---|---|---|
| LINE NUMBER + | INPUT HEADER INFORMATION | ADDRESS | ADDRESS | CONVERSION INFORMATION (OUTPUT HEADER INFORMATION) |
| | | 0 → | 0 | |
| | | 1 → | 1 | |
| | XAB | 2 → | 2 | CD |
| | | | | |
| | | 511 → | 511 | |
FIG. 17A
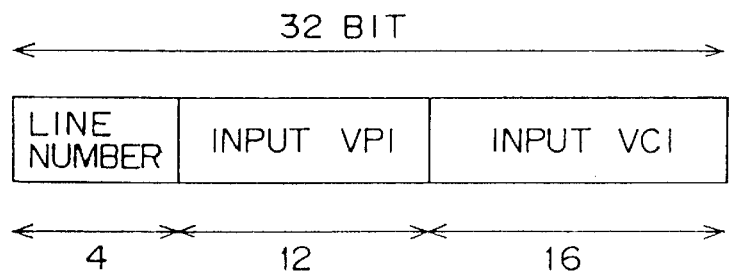
FIG. 17B
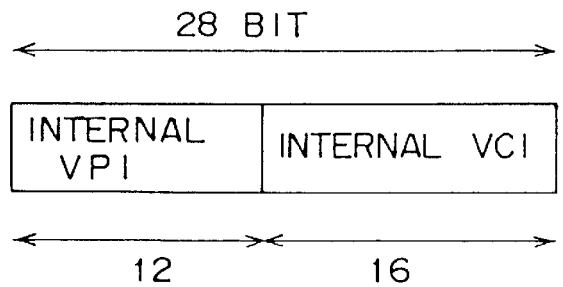
FIG. 17C

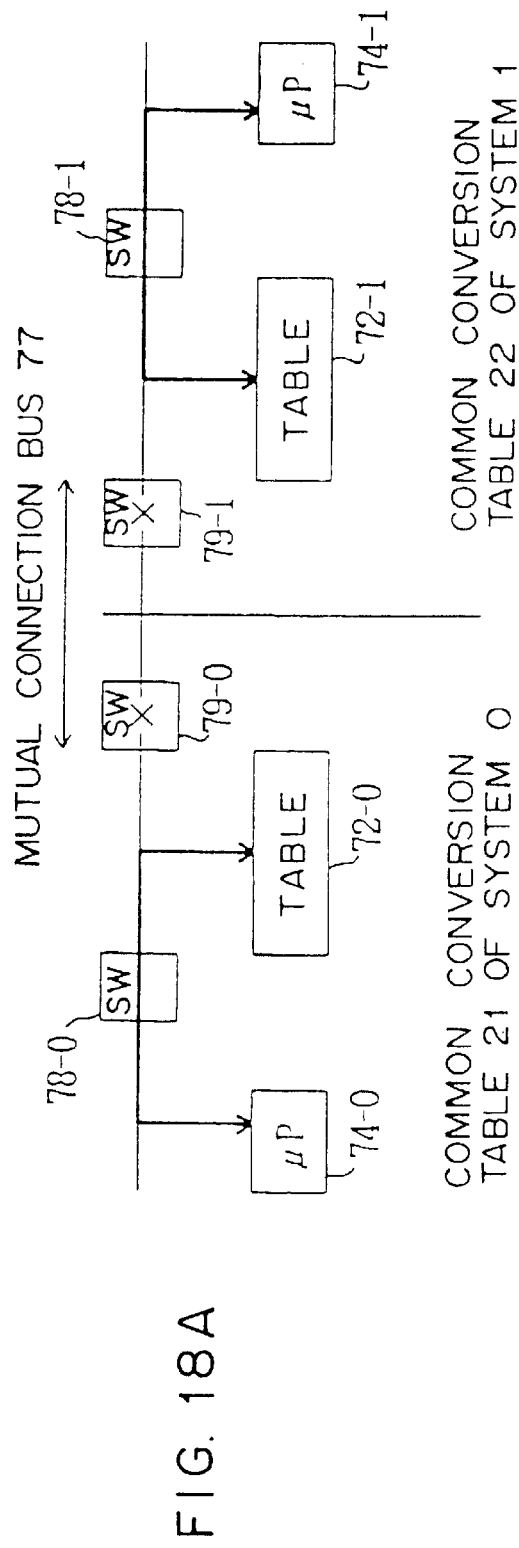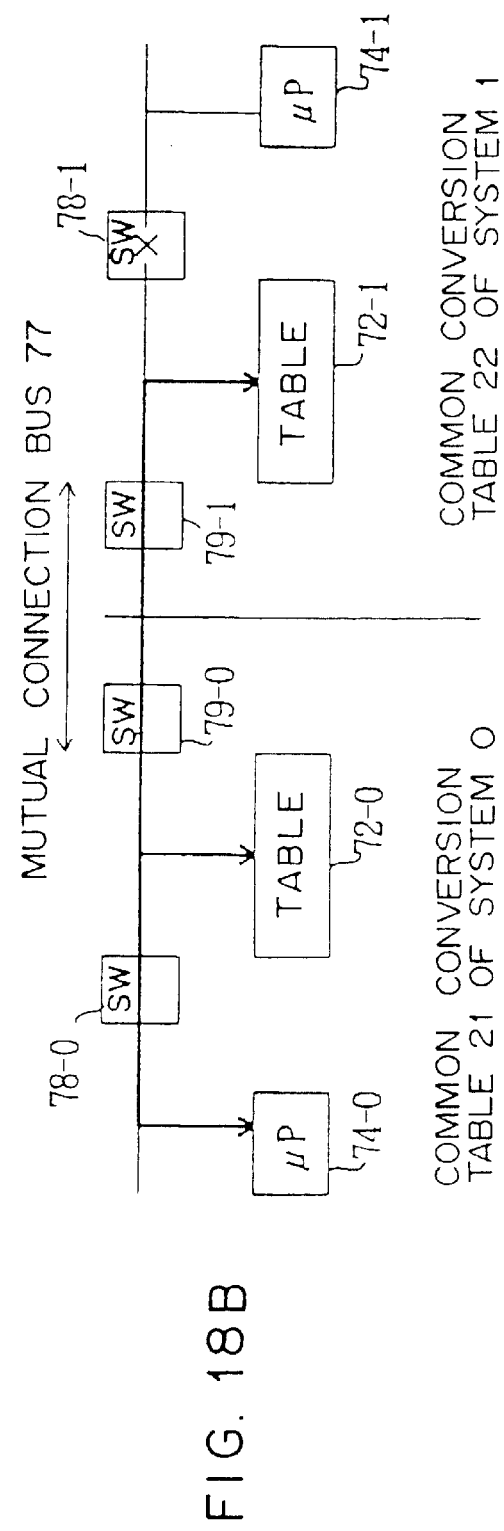

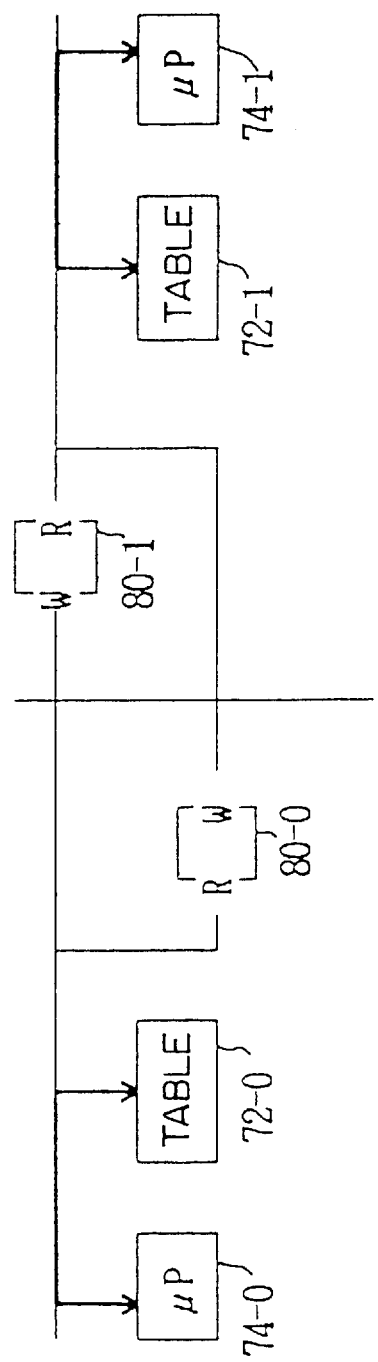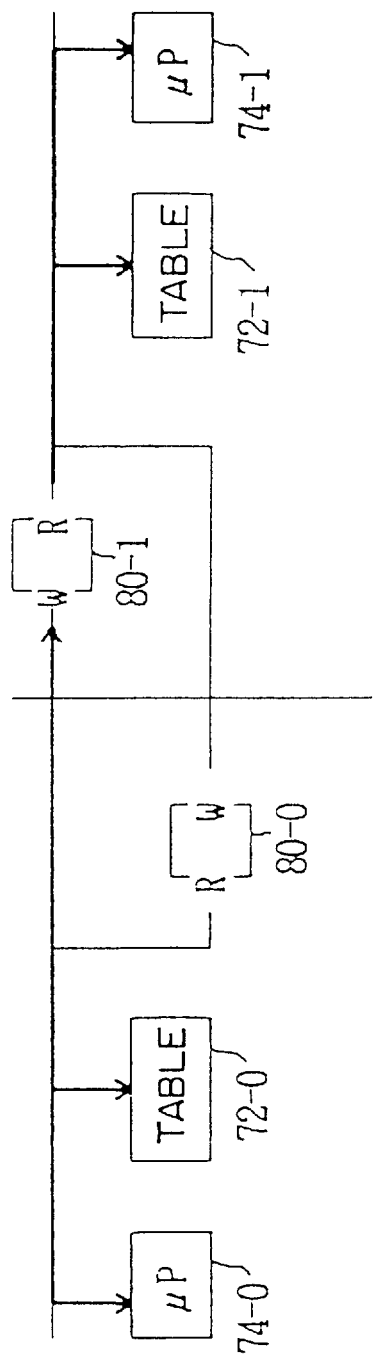

HEADER CONVERTING METHOD

BACKGROUND OF THE INVENTION

1. Field of the Invention

The present invention relates to a system for converting header information included in a packet for transmitting information, and in particular to a converting function of header information included in an ATM cell for use with an ATM switch system.

2. Description of the Related Art

In recent years, a service that integrally handles a variety of communications including picture data requiring a high transmission speed in addition to audio data and text data has become essential. The core technology of such a service is the ATM (Asynchronous Transmission Mode).

In the ATM, a data transmission unit having a payload composed of 48 octets of information (a fixed length) and control information (such as address information) composed of 5 octets, is used. The control information is referred to as a header.

FIGS. 1A and 1B are schematic diagrams showing the structures of formats of ATM cells. ATM cells have two different formats that are defined in a UNI (User-Network Interface) and in an NNI (Network-Network Interface). The UNI is an interface point between a subscriber and an ATM switch system. The NNI is an interface point between ATM switch systems or between stations.

FIG. 1A shows the format of an ATM cell in the UNI. Referring to FIG. 1A, the first four bits of the header is an area for storing a GFC (General Flow Control) used to prevent cells from colliding in the UNI. The GFC is followed by an 8-bit VPI (Virtual Path Identifier), followed by a 16-bit VCI (Virtual Channel Identifier), followed by a PTI (Payload Type Identifier), followed by an HEC (Header Error Control), and followed by a payload. FIG. 1B shows the format of an ATM cell in the NNI. Referring to FIG. 1B, the format of an ATM cell in the NNI format is the same as that in the UNI format except that the GFC is not provided and the number of bits of the VPI is 12.

The VPI is data for use in identifying a virtual path while the VCI is data for use in identifying a virtual channel. The identification information VPI/VCI is referred to as routing information.

FIG. 2 is a schematic diagram showing a construction of an ATM switch system. The switch system comprises virtual channel conversion units (VCC) on the input and output sides of the switch. That is, the VPI/VCI stored in the header of the input cell (input VPI/VCI) is converted into a VPI/VCI for use in the switch (internal VPI/VCI) on the input side of the switch. The internal VPI/VCI stored in the header of the cell output from the switch is converted into the VPI/VCI for use in outputting the cell (output VPI/VCI) on the output side of the switch. The method of using an internal VPI/VCI in a switch is adopted as a method of performing a high-speed process in a switch system.

Input line interface units 101-1 to 101-3 accommodate subscriber lines and lines to other switches. On subscriber lines, ATM cells in the format shown in FIG. 1A are transmitted corresponding to the UNI. On lines between switch systems, ATM cells in the format shown in FIG. 1B are transmitted corresponding to the NNI. Each of the input line interface units 101-1 to 101-3 performs such as a header converting process (converting the input VPI/VCI into an internal VPI/VCI for a cell that is input through such lines and sends the resultant cell to an ATM switch 102.

Each of the input line interface units 101-1 to 101-3 accommodates a plurality of input lines and has VCCs (Virtual Channel Conversion units) for individual input lines. Each VCC in the input line interface units 101-1–101-3 retrieves the internal VPI/VCI as the header information in the ATM switch 102 as an input VPI/VCI, and rewrites the input VPI/VCI into an internal VPI/VCI. In other words, header information of each of cells that are input to the ATM switch is converted by a particular VCC. The resultant cell is sent to the ATM switch 102.

The ATM switch 102 is a self-routing switch. The hardware of the ATM switch 102 autonomously switches and sends an input cell to one of output line interface units 103-1 to 103-3 corresponding to the header information of the input cell.

Each of the output line interface units 103-1 to 103-3 accommodates an output line assigned a VCC. The VCC converts the internal VPI/VCI stored in the header of the cell output from the ATM switch 102 into an output VPI/VCI and outputs it to an output line.

Thus, the header information about the cell input to the ATM switch is converted by the input line interface units 101-1–101-3 and the output line interface units 103-1–103-3, and the cell is output to the output line identified by the VPI/VCI.

FIG. 3A is a block diagram showing a construction of an input line interface unit 101. The input line interface unit 101 has a discrete portion 110 and a common portion 120. The discrete portion 110 accommodates a plurality of input lines #0 to #3. The common portion 120 performs a converting process for the header information and a multiplexing process. The discrete portion 110 has line terminating units 111 (#0 to #3) for individual input lines. The common portion 120 is duplicated as a common portion 121 of system 0 and a common portion 122 of system 1, so as to allow the switch system to perform processes run even if a defect occurs or maintenance of the switch system is performed. The common portion 121 of system 0 has VCC 123 (#0 to #3) corresponding to the line terminating units 111 (#0 to #3) of the discrete portion 110. For example, when a cell is input through the line terminating unit 111 (#0), the header information of the cell is converted by the VCC 123 (#0) and output to the ATM switch 102. The construction of the common portion 122 of system 1 is the same as that of the common portion 121 of system 0. These common portions 121 and 122 execute their processes in parallel. One of the output signals from the common portions 121 and 122 is sent to the ATM switch 102.

FIG. 3B shows the configuration of the output line interface unit 103. The output line interface unit 103 comprises VCC 151 (#0–#3) for each output line. Each output line is terminated by a line terminating unit 152 (#0–#3). The VCC 151 (#0–#3) is not shown in the attached drawings, but is also a duplex system as with the VCC 123 (#0–#3).

FIG. 4A is a block diagram showing a construction of the VCC 123. The construction of a VCC 123 is the same as that for each of #0 to #3. The VCC 123 has a conversion controlling unit CNV 130 (that controls a converting process of header information) and a VPI/VCI conversion table VCT 140 (hereinafter referred to as conversion table) that stores data used in the converting process. When a cell is input to the VCC 123, an input header analyzing unit 131 in the conversion controlling unit 130 analyzes the header information of the input cell. A table access controlling unit 132 accesses a memory 141 in a conversion table 140 corresponding to an address generated corresponding to the analyzed header information. That is, the header information (internal VPI/VCI) is read from the conversion table 140 using the input VPI/VCI stored in the header of the input cell as an address. The resultant output header information is sent to a header converting unit 134. Further, the input cell is delayed by a delaying circuit 133 with a predetermined time period and then sent to the header converting unit 134. The header information of the input cell is converted into output header information read from the conversion table 140 by the header converting unit 134. The contents of the conversion table 140 are rewritten by a control system of the ATM switch system (CPR).

FIG. 4B shows the configuration of the VCC 151. The configuration of the VCC 151 is fundamentally the same as that of the VCC 123. However, the conversion table in the VCC 151 stores the output VPI/VCI, that is, the routing information, for use in outputting a cell to an output line using as an address the internal VPI/VCI stored in the header of the cell output from the ATM switch 102.

Thus, in the conventional ATM switch system, the VCCs are disposed for individual input lines in a VCC distributed construction.

However, the construction in which VCCs are distributed has the following problems. Described below is the operations performed on the input side of the ATM switch 102. The problems are the same on the output side.

(1) Low Use Efficiency of Hardware

As described above, when VCCs are disposed for individual input lines, the number of conversion controlling units 130 and conversion tables 140 should be correspondingly increased. With the configuration, although the circuit size of the conversion controlling unit 130 can be comparatively reduced, the circuit scale of the conversion table 140 tends to increase. In other words, as shown in FIG. 1A, the bit lengths of the VPI/VCI in the UNI (User-Network Interface) are, for example, 8 bits and 16 bits, respectively. Thus, if header information (internal VPI/VCI) is assigned to all input VPIs/VCIs for conversion, the number of combinations becomes $2^8 \times 2^{16} = 2^{24} = 16,777,216$. Further, as shown in FIG. 1B, the bit lengths of VPI/VCI in the NNI (Network-Network Interface) are, for example, 12 bits and 12 bits, respectively. Thus, if output header information is designated to all input VPIs/VCIs, the number of combinations becomes $2^{12} \times 2^{16} = 2^{28} = 268,435,456$.

To store such a huge amount of output header information, a very large table (memory) is required. Consequently, it is not practical to dispose such tables for individual input lines. In reality, the numbers of VPIs/VCIs communicated at the same time are calculated by a simulation or the like corresponding to the average use ratios of the input lines or the like. The size (memory capacity) of each of the conversion tables is determined corresponding to the calculation results. The resultant tables of the calculated size (memory capacities) are disposed for the individual input lines.

However, in the ATM switch system, a situation in which the use ratio of a particular line becomes high may take place. For example, if a defect takes place on a line connected between certain stations, cells sent through the line are routed to another line. Thus, the use ratio of the routing line increases. When the use ratio of a particular line increases, the numbers of VPIs/VCIs communicated on the line at the same time increases. Thus, it is necessary to provide a conversion table with sufficient free space for storing the header information necessary for converting all VPIs/VCIs. Since the variation of the line use ratio may take place on any line, to securely convert headers on all lines, the conversion tables of all the lines should have sufficient free space.

However, since the use ratio of each line is around the average use ratio, if the conversion tables of all the lines have free space, non-use areas of the memories of the conversion tables increase and thereby the use efficiency thereof deteriorates. In other words, since the memories of the conversion tables have unnecessary storage capacities, the hardware size corresponding to individual lines increases and the cost of the entire switch system rises.

(2) Low Adaptivity for Duplicate Construction

As described above, in the input line interface unit 101 with the VCCs, to prevent the switching service from stopping due to a hardware defect or the like, the common portion 120 is duplicated as shown in FIG. 3. In addition, the header converting process for a cell is performed by the VCC 123 of the input line interface unit 101. However, if a defect takes place in the header conversion, since a cell may be incorrectly switched or discarded, the service will be seriously affected. To prevent such a problem, the common portion 120 is duplicated. In other words, the construction of the common portion 122 of system 1 is the same as that of the common portion 121 of system 0. Each of the common portion 122 of system 1 and the common portion 121 of system 0 has VCC 123 (#0 to #3) corresponding to the input lines #0 to #3. One of the common portion 121 of system 0 and the common portion 122 of system 1 should be operated in an active state and the other should be operated in a standby state.

To immediately switch one system with a defect to the other system, it is necessary to cause the common portion 121 of system 0 to operate in the same manner as the common portion 122 of system 1. In other words, the VCC 123 (#0 to #3) of the common portion 121 of system 0 should perform the same header converting processes as the relevant VCC 123 (#0 to #3) of the common portion 122 of system 1. For example, the state of the VCC 123 (#0) of the common portion 121 of system 0 should be the same as the state of the VCC 123 (#0) of the common portion 122 of system 1. In reality, the contents of the conversion tables of the VCC 123 (#0 to #3) of the common portion 121 of system 0 should accord with those of the common portion 122 of system 1. In other words, the relation of the input VPI/VCI and the internal VPI/VCI stored in the conversion tables of system 0 should accord with that of the system 1. The same designations are performed for the conversion tables of the systems 0 and 1 by the software of the controlling unit of the switch system.

If a defect takes place in the VCC 123 (#0) of the common portion 121 of system 0 in the duplicated input line interface unit 101, the common portion 121 of system 0 is placed in the out-of-service state. In this case, the hardware of the common portion 121 of system 0 should be repaired or replaced and the common portion 120 should be re-duplicated so as to place the common portion 121 of system 0 in the in-service state. In this case, the contents of the VCCs of the common portion 122 of system 1 should be designated to the VCCs of the common portion 121 of system 0. The process for designating the contents of VCCs of one common portion to the contents of VCCs of the other common portion, and placing the other common portion in the in-service state, is referred to as a VCC copy process.

As a method for accomplishing the VCC copy process, the software of the controlling unit of the switch system (processed by a control processor CPR that manages and controls the entire switch system) performs the designations for the VCCs of the common portion 122 of system 1 to the VCCs of the common portion 121 of system 0. In this method, it is not necessary to dispose special hardware for performing the VCC copy process. However, since all processes are performed by the software of the controlling unit of the switch system, when the number of input lines accommodated by the switch system increases, the load on the control system proportionally increases. In other words, since the controlling unit of the switch system performs the VCC copy process, its resources are correspondingly used, and thereby the capacity of the switching process is proportionally decreased. Thus, a system for performing the VCC copy process in a short time and with a decrease in processes of the controlling unit of the switch system is desired.

To satisfy such requirements, as shown in FIG. 5, a system in which a common portion 120 of an input line interface unit 101 has hardware with a mutual connection bus for allowing the VCC copy process to be performed between VCCs of both the systems, has been accomplished. The construction of the mutual connection bus is disposed for each of VCCs (namely, VCC #0, VCC #1, VCC #2, and VCC #3). However, the hardware scale of the construction of the mutual connection bus is generally large. In addition, a processor that performs the VCC copy process and firmware thereof are required. Thus, in the construction in which VCCs are disposed for individual lines, when the number of lines accommodated in the switch system increases, the number of VCCs proportionally increases. Consequently, the hardware scale necessary for the VCC copy process increases and the cost thereof rises.

Thus, in the VCC distributed construction in which VCCs are disposed for individual lines, the use efficiency of hardware (in particular, the memories disposed in the VCCs) is low. In addition, the construction in which the processes of the controlling unit of the switch system are reduced and the VCC copy process is performed at a low cost, cannot be accomplished.

SUMMARY OF THE INVENTION

The present invention is intended to solve the above-mentioned problems. An object of the present invention is to improve the use efficiency of hardware so as to reduce the hardware size of a switch system and accomplish a header converting function for cells at a low cost.

An aspect of the present invention is a header converting system provided with a plurality of input ports receiving a fixed length packet for converting a routing information in a header of the fixed-length packet having an information field and a header including routing information. The header converting system according to the present invention comprises the following units.

A plurality of header analyzing units, connected to the input ports, adapted for analyzing the header of a fixed-length packet received at each of the input ports and extracting first routing information from the header.

A conversion information storing unit, accessed by the plurality of header analyzing units, collates the first routing information included in the header of the received fixed-length packet with a second routing information to be converted from the first routing information.

A converting unit, connected to at least one of the plurality of header analyzing units, is adapted for converting first routing information into the second routing information extracted from the conversion information storing unit and providing with the second routing information to the header of the fixed length packet.

In the header converting system according to the present invention, information for converting a header is stored in the conversion information storing unit disposed in common with a plurality of input lines. Since only one storing unit (memory) is used for a plurality of input lines, the hardware scale is small.

Cache memories may be disposed corresponding to individual header analyzing units. In this configuration, accesses from each header analyzing unit to the conversion information storing unit can be reduced. In addition, the time necessary for the header converting process can be shortened.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10A is a schematic diagram showing data extracted from an input cell;

FIG. 10B is a schematic diagram showing data sent from a controlling unit of a switch system;

FIG. 10C is a schematic diagram showing a format of data read from a conversion table;

FIG. 12A is a schematic diagram showing a format of data that is read accessed to the common conversion table for converting the header of an input cell;

FIG. 12B is a schematic diagram showing a format of data that is read/write accessed from/to the common conversion table corresponding to a request issued from the controlling unit of the switch system;

FIG. 12C is a schematic diagram showing a format of data that is read from the common conversion table and sent to the conversion controlling unit;

FIG. 15A is a schematic diagram showing a structure of a table corresponding to a fixed allocating system;

FIG. 15B is a schematic diagram showing data stored in the table shown in FIG. 15A;

FIG. 16 is a schematic diagram for explaining a structure of a table corresponding to a first dynamically allocating system;

FIG. 17A is a schematic diagram for explaining a structure of a table corresponding to a second dynamically allocating system;

FIG. 17B is a schematic diagram showing a structure of data stored in a CAM;

FIG. 17C is a schematic diagram showing a structure of data stored in a table;

FIG. 18A is a block diagram showing a construction of a system for connecting two systems with a mutual connection bus in a normal state;

FIG. 18B is a block diagram for explaining a VCC copy with the mutual connection bus;

FIG. 19A is a block diagram for explaining a system for connecting two systems with a dual port memory in a normal state;

FIG. 19B is a block diagram for explaining a VCC copy with the dual port memory;

DETAILED DESCRIPTION OF THE INVENTION

Figure 6:
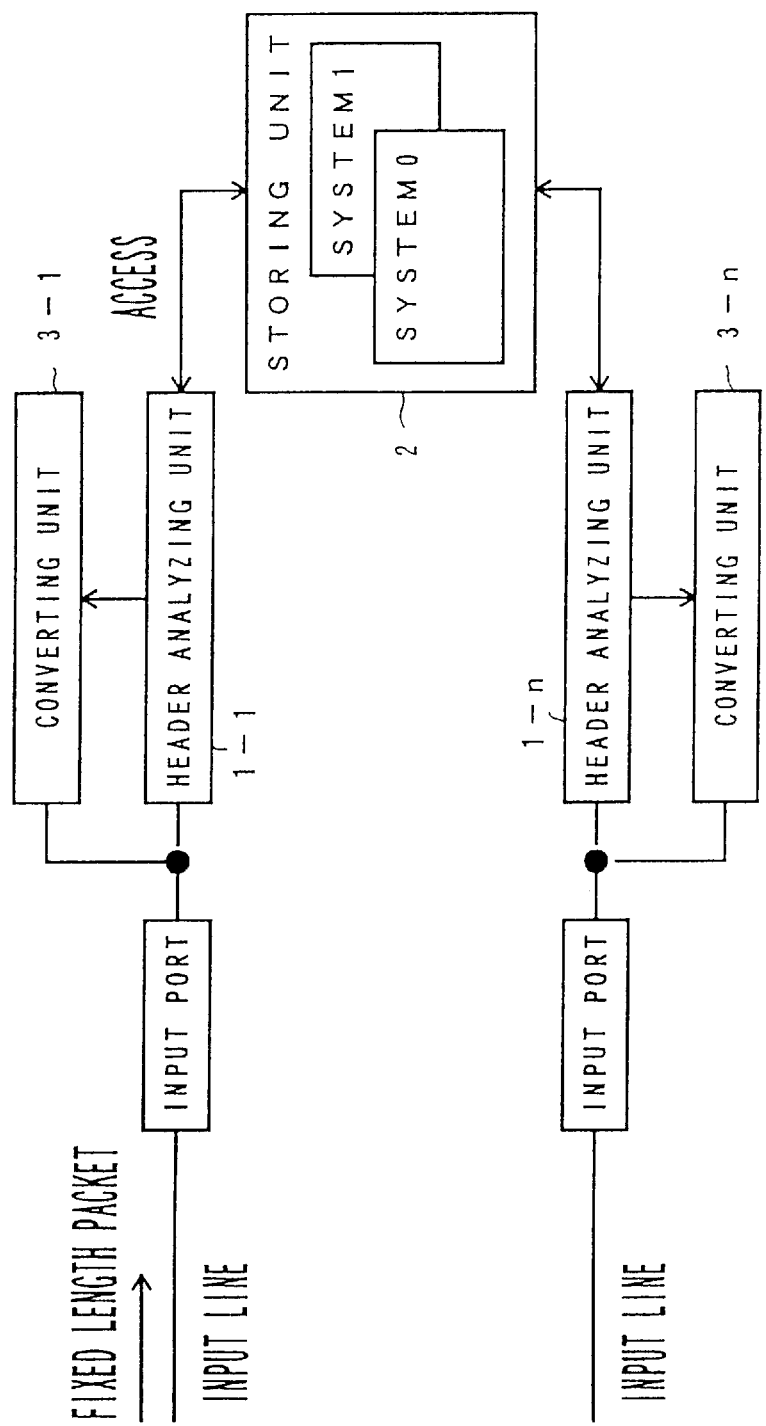
FIG. 6 is a block diagram for explaining the concept of the present invention.

Next, with reference to FIG. 6, the concept of the present invention will be described.

The present invention is a system for switching a fixed-length packet having fixed length data field and a header containing routing information for autonomously routing the data field. When the switching system is an ATM network, the control information is VPI/VCI.

Header analyzing units 1-1, ..., 1-n are disposed for individual input lines, and retrieves the routing information by analyzing the header of the fixed-length packet received at each input port.

A storing unit 2 comprises a table for storing the routing information retrieved by the header analyzing units 1-1, ..., 1-n (first routing information) and the routing information to be added to the header of the fixed-length packet when it is output (second routing information) after associating them with each other.

The header analyzing units 1-1, ..., 1-n access the storing unit 2 according to the first routing information to retrieve the second routing information.

Converting units 3-1, ..., 3-n are provided for individual input ports, receive the second routing information retrieved by the header analyzing units 1-1, ..., 1-n, and perform a header converting process by rewriting the first routing information into the second routing information.

The storing unit 2 is disposed in a unit (or on a board) separate from the header analyzing units 1-1, ..., 1-n and the converting units 3-1, ..., 3-n. In addition, the storing unit 3 is duplicated.

In the header converting system according to the present invention, information used for converting the headers of fixed-length packets that are input from a plurality of input lines are concentratively stored in a storing unit 2. The storing unit 2 is accessed by a plurality of header analyzing units 1-1, ..., 1-n disposed for individual input lines. Thus, the use efficiency of the storing unit 2 is improved. In particular, a storage area of the storing unit 2 is allocated to the input lines. When a large storage region is allocated to an input line with a large number of channels communicated at the same time, the non-use storage regions of the individual input lines are reduced.

When the storing unit 2 is duplicated, the contents of two systems of the storing units 2 should be matched. If necessary, a copy process should performed between the systems of both the systems (information stored in one system is copied to the other system). However, since the storing unit 2 is separate from header analyzing units 1-1, ..., 1-n and the converting units 3-1, ..., 3-n, when the header analyzing units 1-1, ..., 1-n, or the converting units 3-1, ..., 3-n are repaired or replaced, the above-described copy process is not required. Thus, the maintenance time can be reduced.

DESCRIPTION OF THE PREFERRED EMBODIMENTS

Figure 1A:
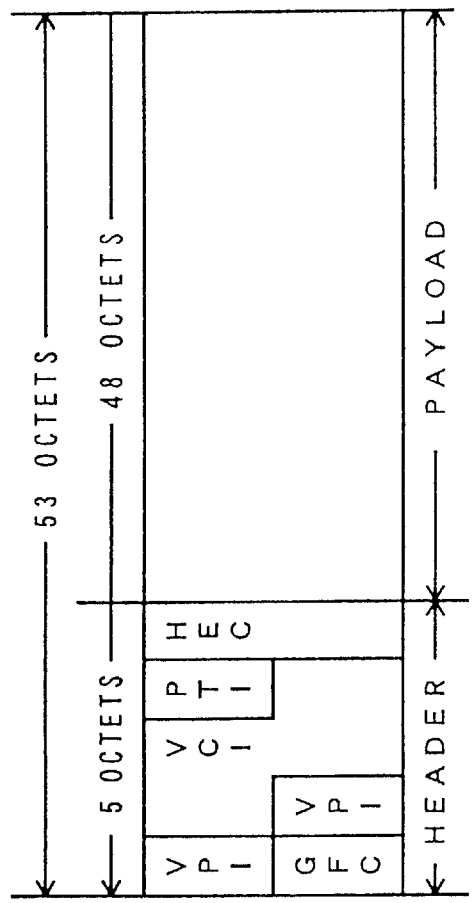
FIG. 1A is a schematic diagram showing a format of an ATM cell in a UNI.
Figure 1B:
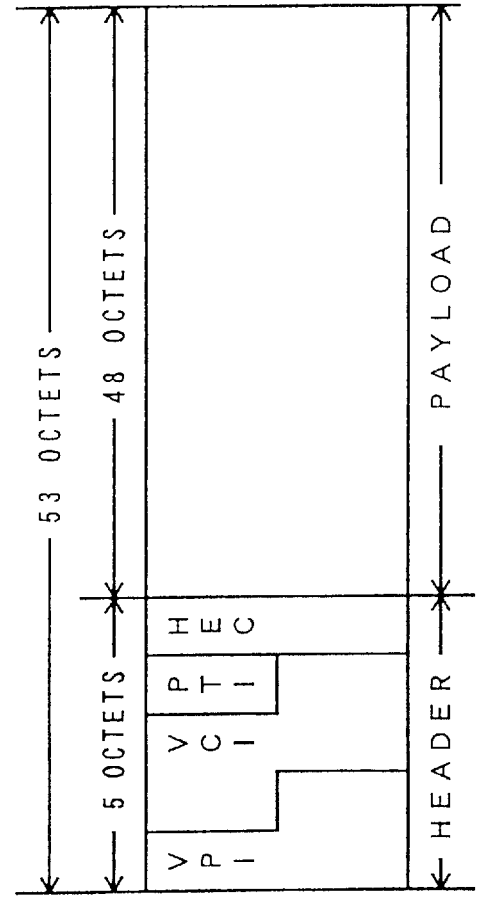
FIG. 1B is a schematic diagram showing a format of an ATM cell in an NNI.
Figure 2:
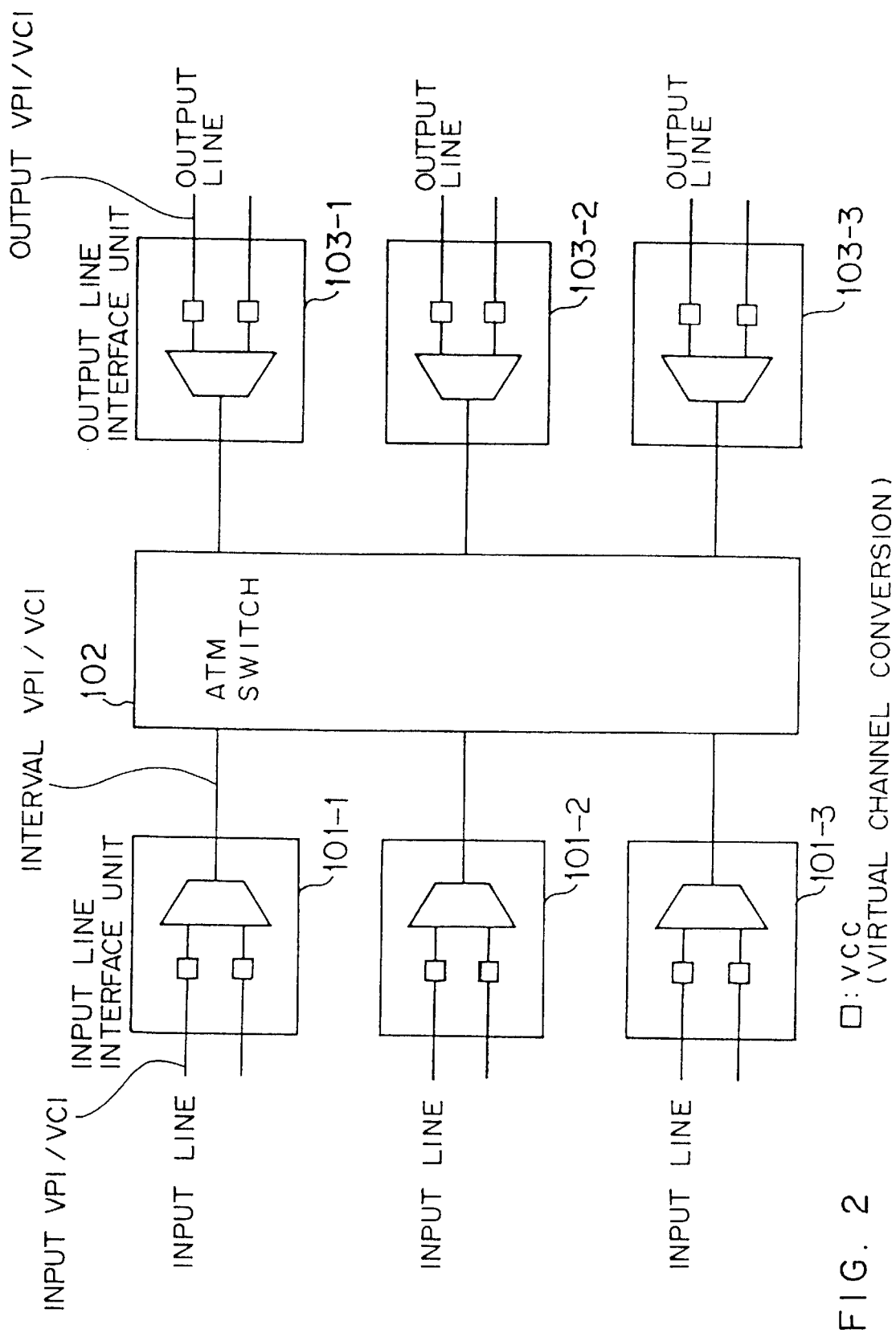
FIG. 2 is a block diagram showing a construction of an ATM switch system.

Next, an example in which the header converting system according to the present invention is applied to an ATM will be described. The ATM switch system is based on the configuration shown in FIG. 2, and comprises a virtual channel conversion unit (VCC) on the input and output sides of the ATM switch 102. That is, on the input side of the ATM switch 102, the VPI/VCI stored in the header of the input cell (input VPI/VCI) is converted into a VPI/VCI for use in the switch (internal VPI/VCI). On the output side of the ATM switch, the internal VPI/VCI stored in the header of the cell output by the ATM switch 102 is converted into a VPI/VCI for use in outputting the cell to the output line (output VPI/VCI).

In the following example, a system in which virtual channel conversion units (VCC) are provided on the input and output sides of an ATM switch is explained. However, the present invention is applied to a system in which a VCC is provided only on the input side of the ATM switch. The VCC on the input side stores VPI/VCI for use in outputting the cell to the output line (output VPI/VCI), and converts VPI/VCI stored in the header of the input cell (input VPI/VCI) into the output VPI/VCI.

Figure 7A:
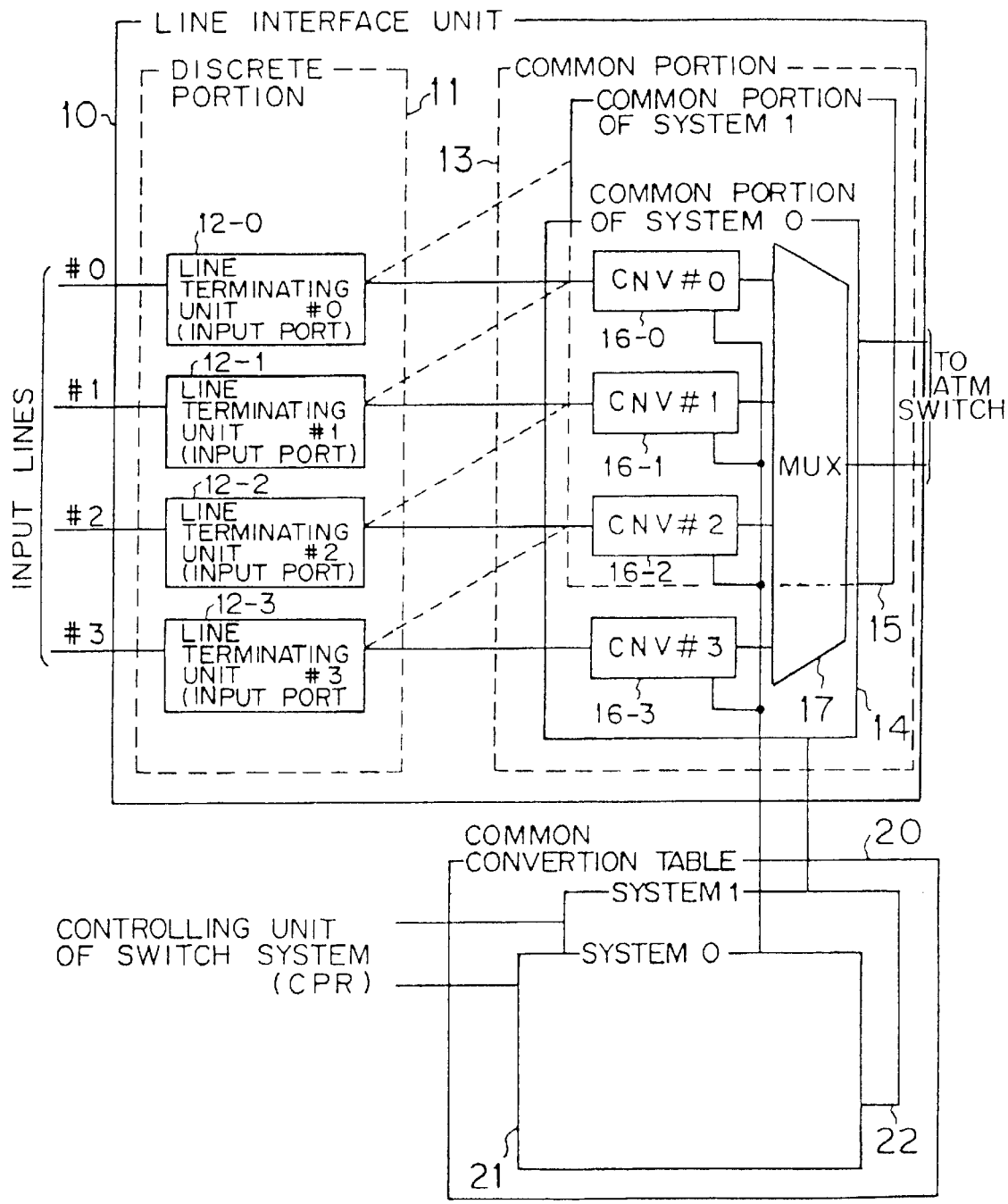
FIG. 7A is a block diagram showing a construction of a header converting function unit on the input side of the switch according to an embodiment of the present invention.

FIG. 7A is a block diagram showing a construction of a header converting function unit (VCC: Virtual Channel Conversion unit) disposed on the input side of an ATM switch of an ATM switch system. The header converting function unit according to the embodiment is composed of a conversion controlling unit CNV and a common conversion table.

Figure 3A:
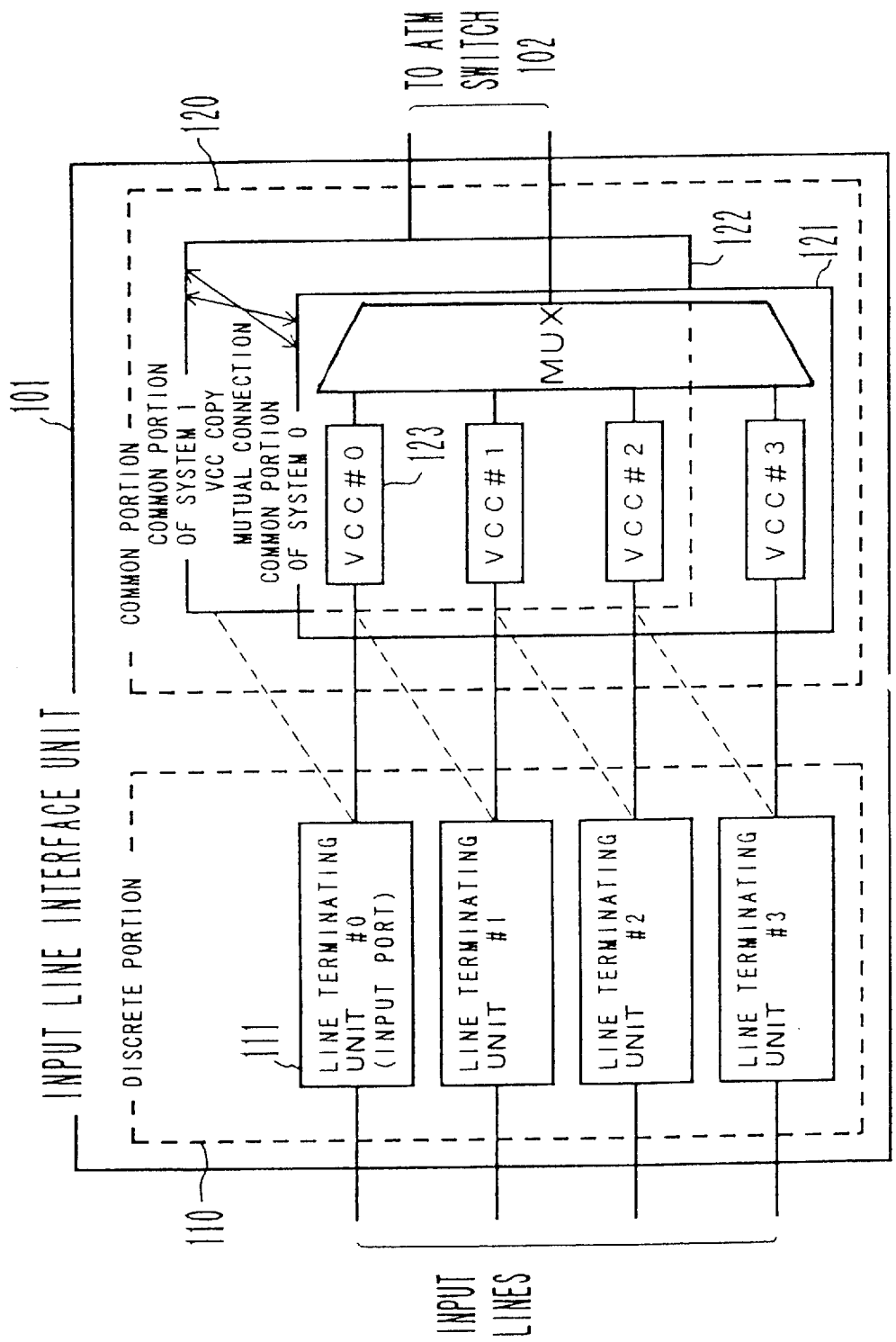
FIG. 3A is a block diagram showing a construction of a conventional input line interface unit.

There are differences between the header converting function unit according to the embodiment (shown in FIG. 7A) and the conventional construction shown in FIG. 3A. In the conventional construction, each VCC 123 corresponding to an individual input line has a conversion table. However, in the construction according to the embodiment, a common conversion table 20 is disposed outside the input line interface unit 10. The common conversion table 20 is disposed for a plurality of input lines.

When the header converting function unit according to the embodiment receives a cell from an input line, it extracts header information (internal VPI/VCI) from the common conversion table 20, converts the VPI/VCI of the input cell into internal VPI/VCI, and sends the resultant cell to the ATM switch.

The line interface unit 10 is constructed of a discrete portion 11 and a common portion 13. The line interface unit 10 multiplexes cells that are input from four input lines #0 to #3 and sends the resultant data to the ATM switch. The discrete portion 11 has line terminating units #0 to #3 (12-0 to 12-3) that terminate the four input lines #0 to #3. The line terminating units 12-0–12-3 are input ports for receiving a cell transferred through the input line.

The common portion 13 is duplicated as a common portion 14 of system 0 and a common portion 15 of system 1. The construction of the common portion 14 of system 0 is the same as the construction of the common portion 15 of system 1. The common portion 14 of system 0 has conversion controlling units CNV #0 to #3 (16-0 to 16-3) corresponding to the line terminating units #0 to #3 (12-0 to 12-3). Each of the conversion controlling units CNV #0 to #3 (16-0 to 16-3) accesses the common conversion table 20, extracts internal VPI/VCI corresponding to the input cell, converts the header of the input cell corresponding to the internal VPI/VCI, and sends the resultant cell to a multiplexing unit 17. The common portion 15 of system 1 performs the same process as the common portion 14 of system 0. In other words, output cells of the line terminating units #0 to #3 (12-0 to 12-3) are received by conversion controlling units CNV #0 to #3 (not shown) of the common portion 15 of system 1 and the similar header converting process is performed for the cells.

The multiplexing unit 17 multiplexes output cells of the conversion controlling units CNV #0 to #3 (16-0 to 16-3). An output cell of the common portion 14 of system 0 and the common portion 15 of system 1 (in-service-state system) is sent to the ATM switch.

The common conversion table 20 is duplicated as with the common portion 13. The common conversion table 20 is constructed of a common conversion table 21 of system 0 and a common conversion table 22 of system 1. The construction of the common conversion table 21 of system 0 is the same as the construction of the common conversion table 22 of system 1. Each of the common conversion tables 21 and 22 stores output header information (internal VPIs/VCIs) used for converting the headers of cells. The header information stored in the common conversion table 21 is the same as the output header information stored in the common conversion table 22.

In FIG. 7, the common portion 14 of system 0 is connected to the common conversion table 21 of system 0, whereas the common portion 15 of system 1 is connected to the common conversion table 22 of system 1. However, the system 0 and the system 1 may be mutually connected. In other words, the common portion 14 of system 0 may access the common conversion table 22 of system 1.

Figure 8A:
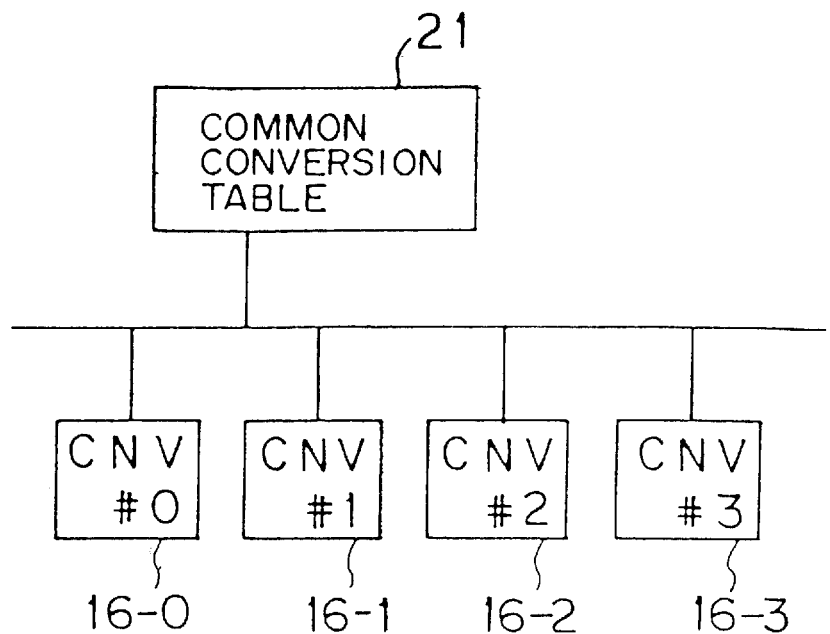
FIG. 8A is a block diagram showing a bus connection between conversion controlling units and a common conversion table.
Figure 8B:
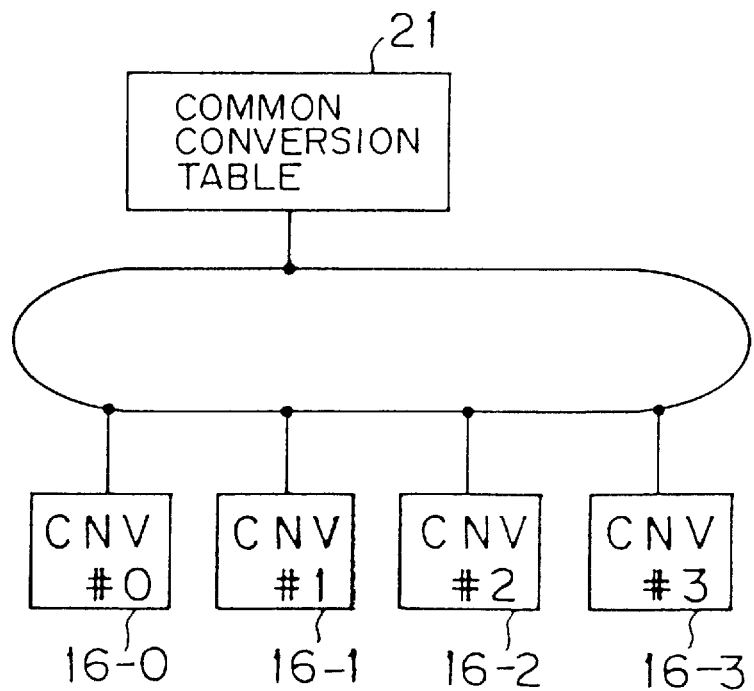
FIG. 8B is a block diagram showing a ring connection between conversion controlling units and a common conversion table.

The conversion controlling units CNV #0 to #3 (16-0 to 16-3) and the common conversion table 20 are connected with discrete connecting wires, in a bus connection construction as shown in FIG. 8A, or in a ring connection construction as shown in FIG. 8B. In these connection constructions, communications are made by a communication protocol used for processors of a multiple processor system, a LAN protocol, or the like. In this embodiment, the conversion controlling units CNV #0 to #3 (16-0 to 16-3) and the common conversion table 20 are connected with a serial bus.

In FIG. 7, the common conversion table 20 is disposed for the lines #0 to #3 accommodated by one line interface unit 10. However, it should be noted that the common conversion table 20 can be disposed for a plurality of line interface units.

Figure 3B:
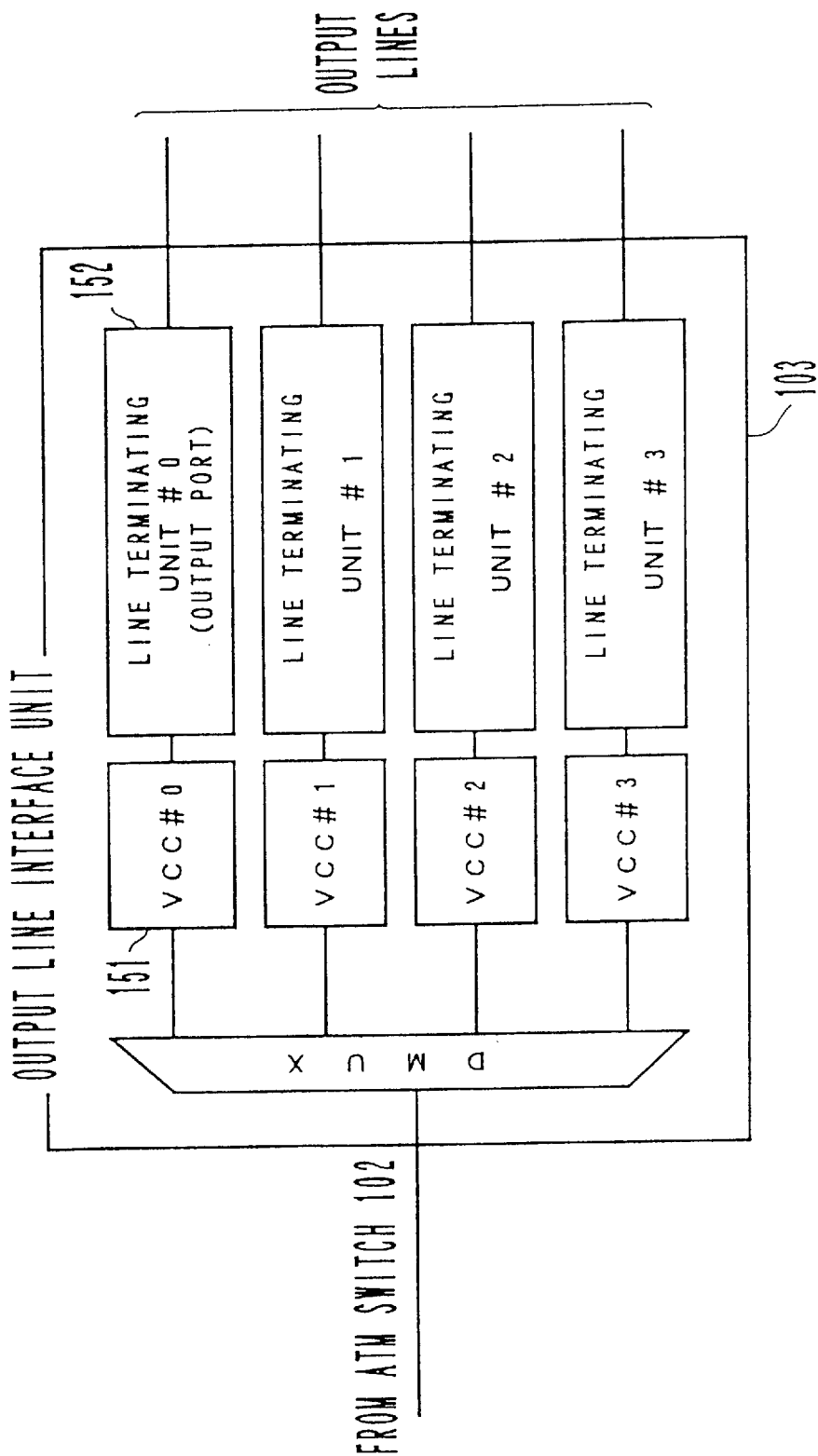
FIG. 3B is a block diagram showing a construction of a conventional output line interface unit.
Figure 4A:
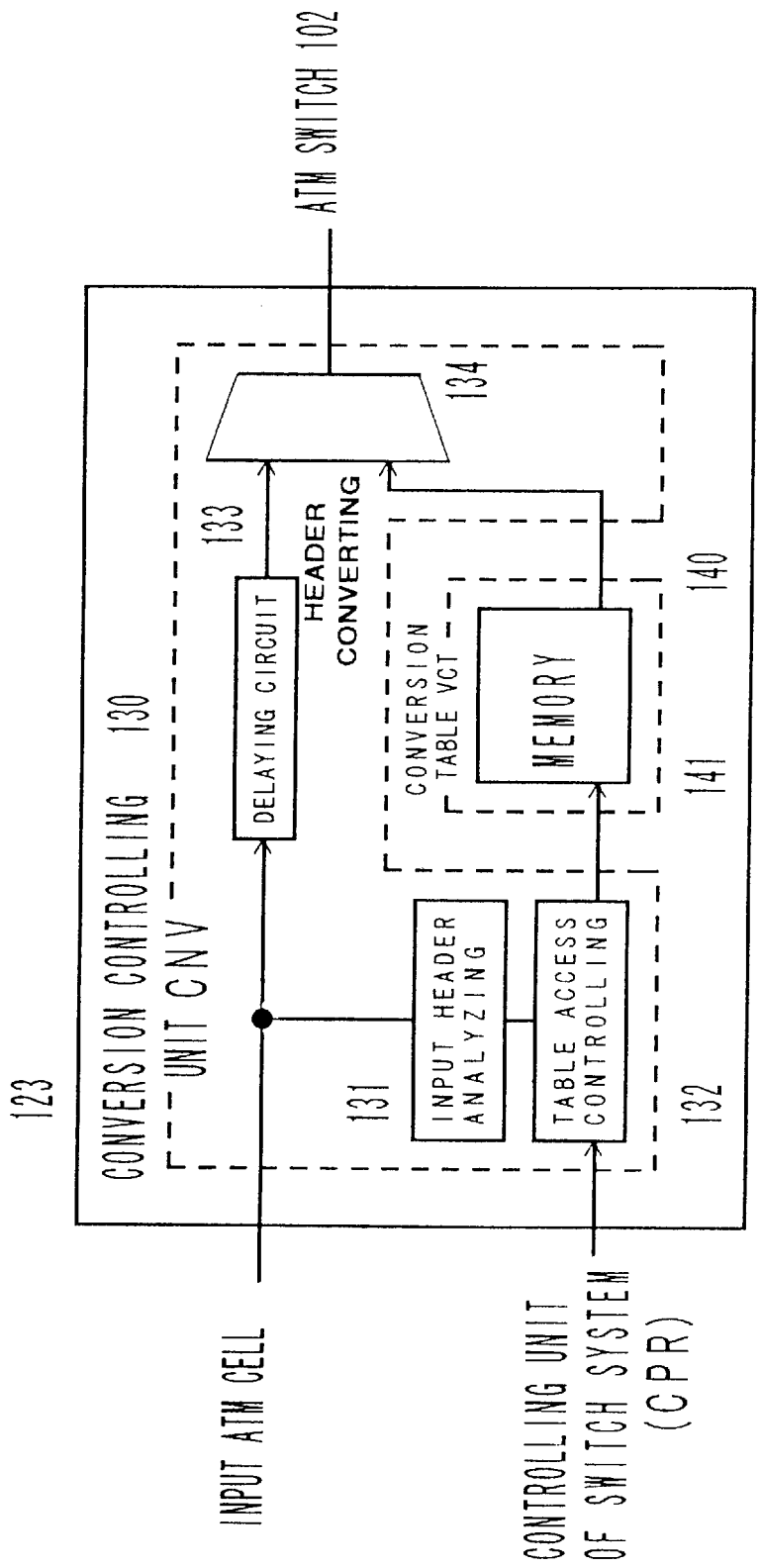
FIG. 4A is a block diagram showing a construction of a conventional VCC (Virtual Channel Conversion unit) on the input side of the switch.
Figure 4B:
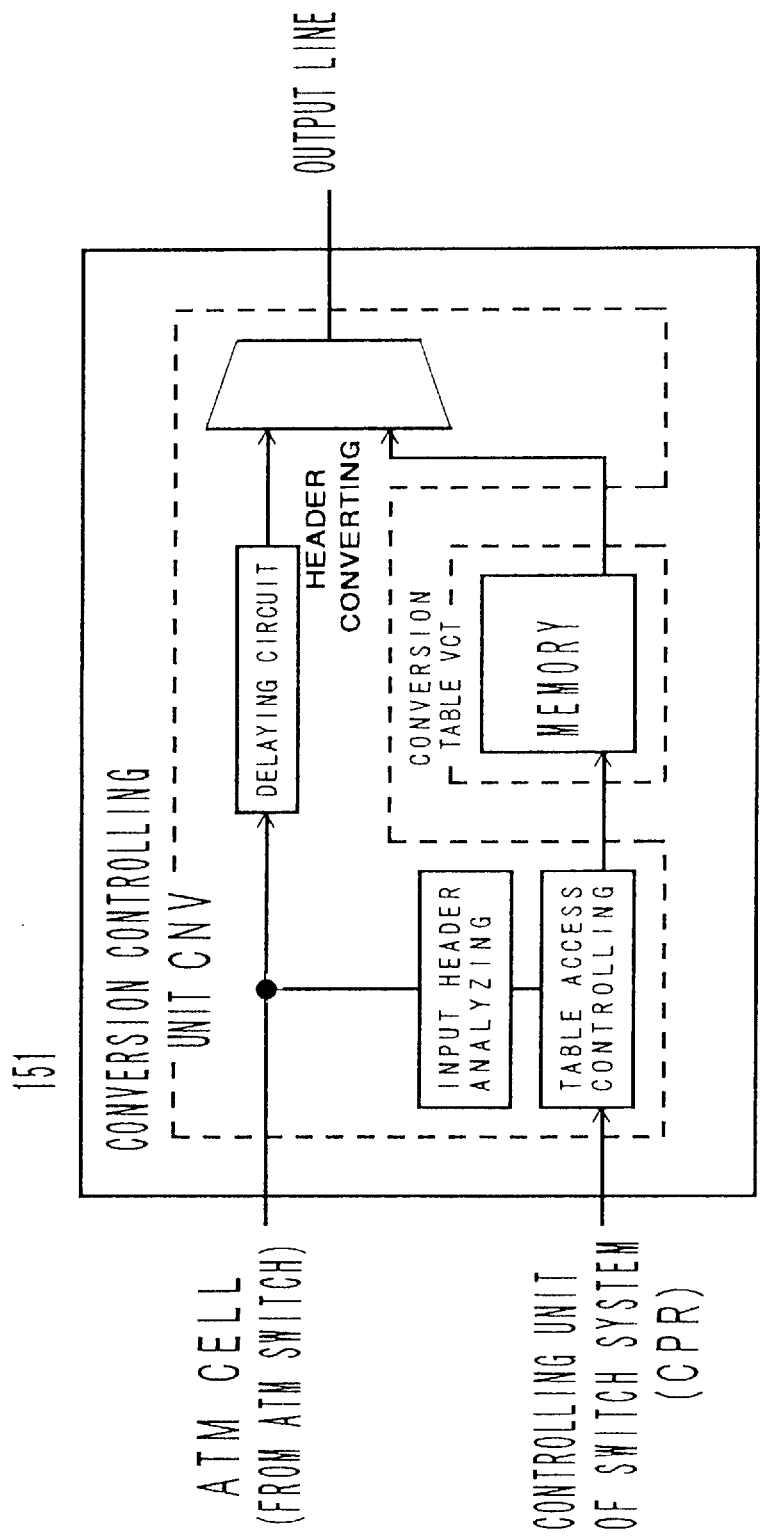
FIG. 4B is a block diagram showing a construction of a conventional VCC (Virtual Channel Conversion unit) on the output side of the switch.
Figure 5:
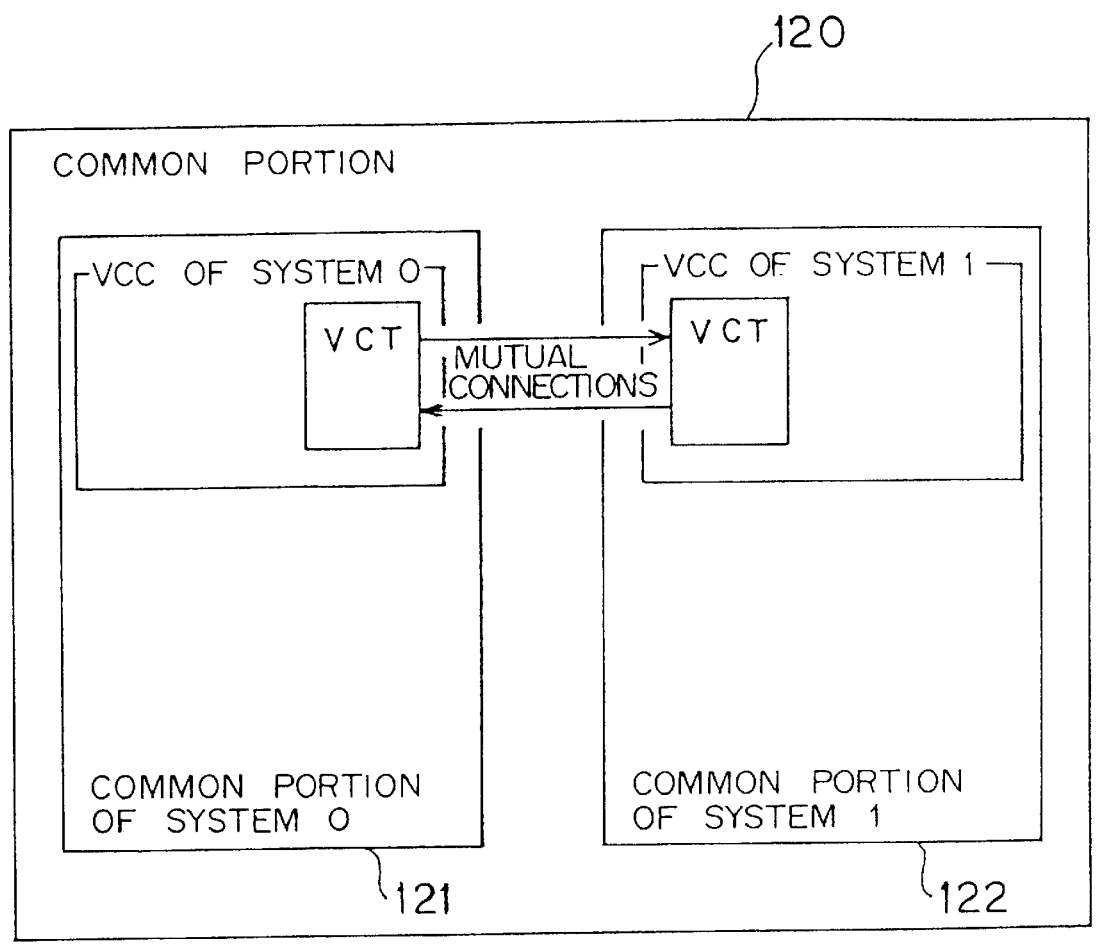
FIG. 5 is a block diagram for explaining an inter-system connection of a duplicated system.

As described above (see FIGS. 3 and 4), in the conventional header converting function unit (VCC: Virtual Channel Conversion unit), conversion tables are disposed for individual lines. However, in the header converting function unit according to the embodiment, one common conversion table 20 is disposed for a plurality of lines. The common conversion table 20 stores internal VPIs/VCIs used for converting headers of cells that are input from a plurality of lines. The conversion controlling units #0 to #3 (16-0 to 16-3) disposed for individual lines access the common conversion table 20.

Figure 7B:
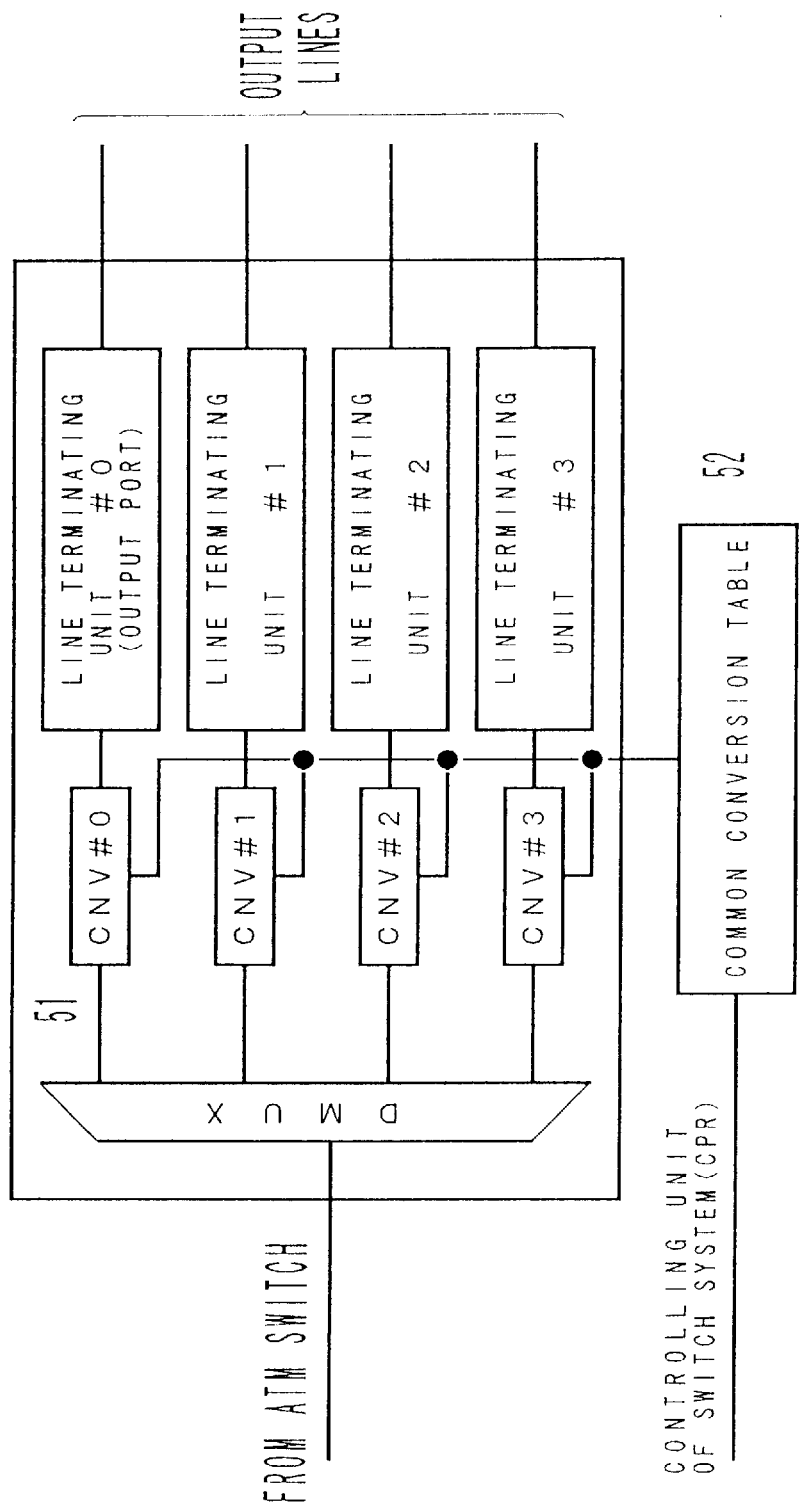
FIG. 7B is a block diagram showing a construction of a header converting function unit on the output side of the switch according to an embodiment of the present invention.

FIG. 7B shows the configuration of the VCC provided on the output side of the ATM switch. The VCC provided on the output side of the ATM switch has a conversion controlling unit (CNV) 51 for each output line, and the configuration of the VCC is fundamentally the same as that of the VCC on the input side. However, the VCC on the output side converts the internal VPI/VCI stored in the header of the cell output from the ATM cell into the output VPI/VCI. The line terminating unit shown in FIG. 7B is an output port for transferring a cell through an output line.

Figure 9A:
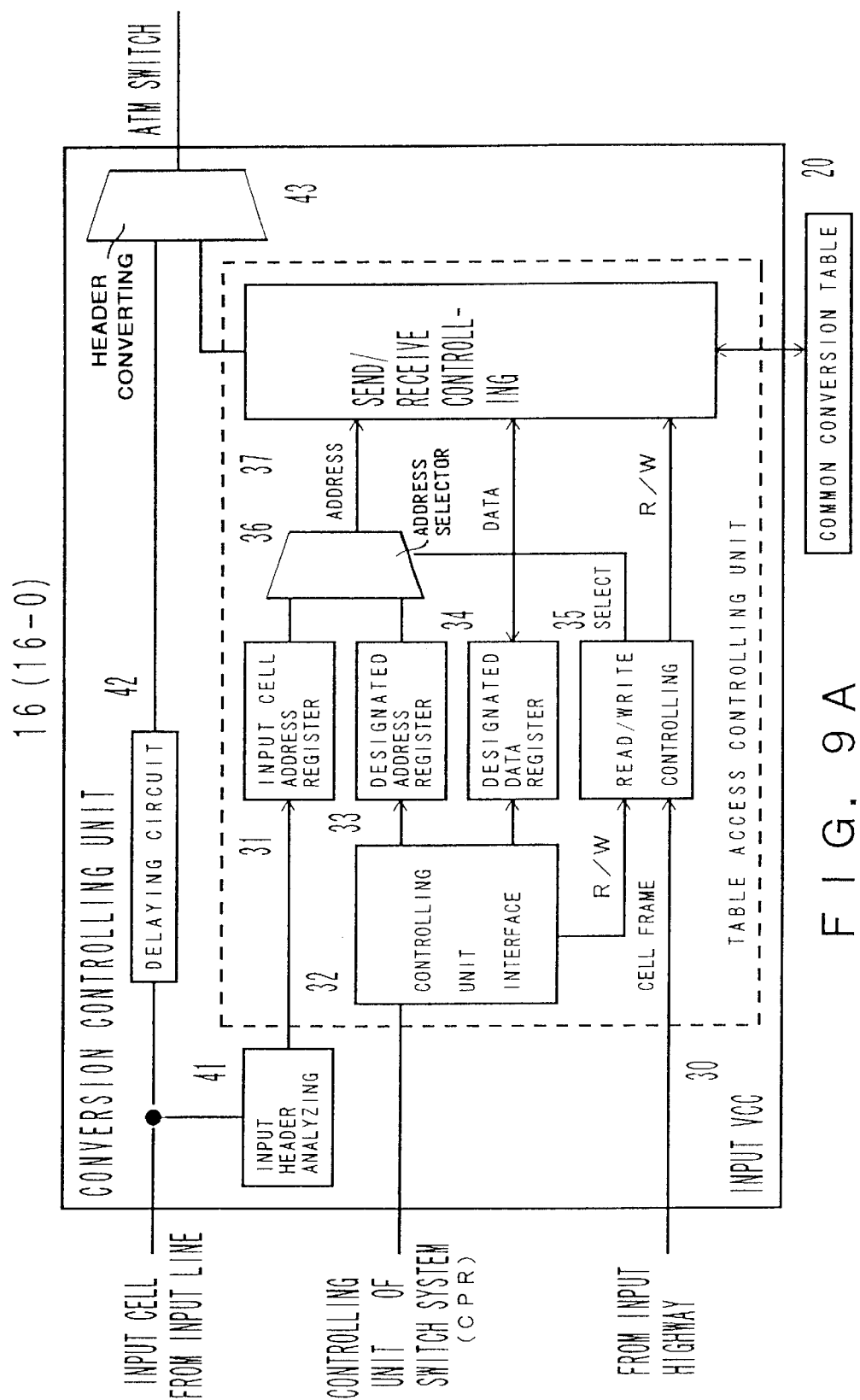
FIG. 9A is a block diagram showing a construction of a conversion controlling unit on the input side of the switch.

FIG. 9A is a block diagram showing a construction of the conversion controlling unit 16 provided in the line interface unit on the input side of the ATM switch. The conversion controlling unit 16 exemplifies the conversion controlling units CNV #0 to #3 (16-0 to 16-3).

The conversion controlling unit 16 is disposed for each input line. The conversion controlling unit 16 accesses the common conversion table 20 corresponding to an address generated corresponding to header information of a cell that is received from an input line. The common conversion table 20 stores internal VPIs/VCIs used for converting the headers of cells that are input from a plurality of lines. The conversion controlling unit 16 extracts internal VPI/VCI from the common conversion table 20 with a key of the address, and performs a header converting process for converting the VPI/VCI stored in the header of the input cell into the internal VPI/VCI.

Designations for the common conversion table 20 are written by a processor that performs a call controlling process for the entire switch system and a software program executed by the processor (hereinafter they are referred to as the controlling unit of the switch system (CPR)). The controlling unit of the switch system (CPR) can directly designate data to the common conversion table 20 and write output header information (namely, internal VPI/VCI) to a particular address of the common conversion table 20 through the conversion controlling unit 16. In addition, if necessary, the controlling unit of the switch system (CPR) references the contents of the common conversion table 20. In this case, the controlling unit of the switch system (CPR) directly accesses the common conversion table 20. Alternatively, the controlling unit of the switch system (CPR) can access the common conversion table 20 through the conversion controlling unit 16.

Thus, the conversion controlling unit 16 has a function for extracting internal VPI/VCI from the common conversion table 20 so as to convert the header of an input cell. In addition, the conversion controlling unit 16 has a function for accessing the common conversion table 20 corresponding to a designation or a reference request received from the controlling unit of the switch system (CPR). Next, the functions of individual blocks of the conversion controlling unit 16 will be described.

An input header analyzing unit 41 references the header of an input cell and generates an address necessary for accessing the common conversion table 20. In other words, the input header analyzing unit 41 latches VPI/VCI stored in the header of the input cell and generates an address for placing an input VPI (12 bits) in 12 MSB bits and an input VCI (16 bits) in 16 LSB bits (a total of 28 bits) as shown in FIG. 10A. The generated address is stored in an input cell address register 31 of a table access controlling unit 30.

The table access controlling unit 30 controls read/write accesses for the common conversion table 20 with to an address generated by the input header analyzing unit 41 or an address sent corresponding to an access request received from the controlling unit of the switch system (CPR). Individual blocks of the table access controlling unit 30 have the following functions.

A controlling unit interface 32 terminates a bus from the controlling unit of the switch system (CPR). The access request received from the controlling unit of the switch system (CPR) is a write access request for designating internal VPI/VCI for the common conversion table 20 or a read access request for referencing the contents of the common conversion table 20. These access requests have a format as shown in FIG. 10B. In FIG. 10B, "R/W bit" is a bit that represents whether an access request received from the controlling unit of the switch system (CPR) is a read access or a write access. When the access request is a read access, "R/W bit" is "0". When the access request is a write access, "R/W bit" is "1". "Designated address" is a write address (SRA) for the common conversion table 20 when internal VPI/VCI are designated to the common conversion table 20. "Referenced address" is a read address (RRA) for the common conversion table 20 when the contents of the common conversion table 20 are referenced. "Designated data" is internal VPI/VCI designated to the common conversion table 20 and written to the designated address. In the case of the read access that references the contents of the common conversion table 20, since it is not necessary to send data, "designated data" is "don't care".

When the conversion controlling unit 16 responds to the controlling unit of the switch system (CPR), data is sent in a format as shown in FIG. 10C. In this case, since this data is a response to a read access from the controlling unit of the switch system (CPR), "R/W bit" is fixed to "read". "Read data" is data (RRD) that is read from the common conversion table 20 corresponding to a read access for converting the header of an input cell or a read access received from the controlling unit of the switch system (CPR). Thus, "read data" is internal VPI/VCI.

When the controlling unit of the switch system (CPR) issues an access request for designating data to the common conversion table 20, the controlling unit interface 32 sends a R/W designating signal that designates a write access to a read/write controlling unit 35. In addition, the controlling unit interface 32 designates a designated address and designated data to a designated address register 33 and a designated data register 34. On the other hand, when the controlling unit of the switch system (CPR) issues an access request for referencing the common conversion table 20, the controlling unit interface 32 sends a R/W designating signal that designates a read access to the read/write controlling unit 35 and designates a referenced address to a referenced address register 33. When the controlling unit interface 32 receives data read from the common conversion table 20, it sends the data to the controlling unit of the switch system (CPR).

The read/write controlling unit 35 controls an access timing for the common conversion table 20. In other words, the read/write controlling unit 35 generates a selection signal for an address selector 36 corresponding to the R/W designating signal that is output from the controlling unit interface 32 in synchronization with the sending timing of the input cell. In addition, the read/write controlling unit 35 informs a send/receive controlling unit 37 of a read access or a write access.

Generally, the timing at which a cell is sent to the conversion controlling unit 16 does not synchronize with the timing at which an access request from the controlling unit of the switch system (CPR) to the common conversion table 20 takes place. Thus, an access for converting the header of an input cell and an access from the controlling unit of the switch system (CPR) may take place at the same time. In this case, a higher priority is designated to the access to the common conversion table 20 for converting the header of the input cell so as to securely perform the header conversion of the input cell.

Figure 11:
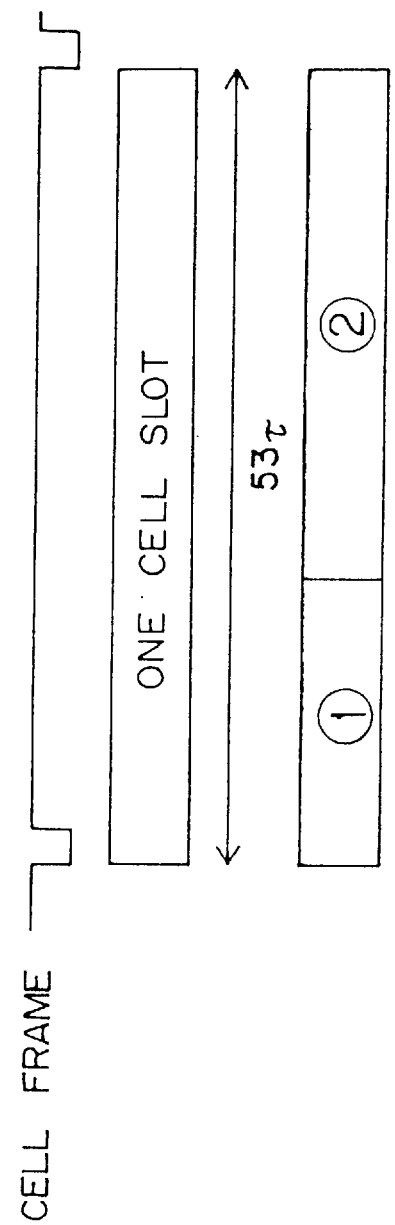
FIG. 11 is a schematic diagram showing timings of a period used for a process for an input cell and of a period used for a process of the controlling unit of the switch system in a conversion controlling unit.

Thus, the read/write controlling unit 35 determines the timings of cells with a cell frame signal that is sent in synchronization and parallel with the cells on an input highway (that is a transmission path disposed between the discrete portion 11 and the common portion 13 in FIG. 7) and that represents the timings of the start positions of the cells. As shown in FIG. 11, the read/write controlling unit 35 separates one cell slot period (53 τ) that is a time period allocated to each cell in the ATM switch system into an access period (1) necessary for converting the header of an input cell and an access period (2) for a request received from the controlling unit of the switch system (CPR). In the period (1), the read/write controlling unit 35 performs a process for reading internal VPI/VCI from the common conversion table 20 with a key of an address generated corresponding to the header information of the input cell. In the period (2), the read/write controlling unit 35 accesses the common conversion table 20 corresponding to an access request received from the controlling unit of the switch system (CPR).

The read/write controlling unit 35 sends the select signal that represents timings of the period (1) and the period (2) to the address selector 36. In addition, when the access request received from the controlling unit of the switch system (CPR) is a write access (designating data to the common conversion table 20), the read/write controlling unit 35 sends the write access request to the send/receive controlling unit 37 in the period (2) just after the write access request is received. Otherwise, the read/write controlling unit 35 sends a read access request to the send/receive controlling unit 37. In other words, in the period (1) designated for an access for converting the header of the input cell or when the access request received from the controlling unit of the switch system (CPR) is a read access (referencing the contents of the common conversion table 20), the read/write controlling unit 35 sends a read access request to the send/receive controlling unit 37.

The address selector 36 receives the select signal, which represents the timings of the periods (1) and (2), from the read/write controlling unit 35. In the period (1), the address selector 36 selects an address (VPI/VCI of the input cell) stored in the input cell address register 31 and sends the address to the send/receive controlling unit 37. In the period (2), the address selector 36 selects an address that is stored in the designated address register 33 (the address is received from the controlling unit of the switch system (CPR)) and sends the address to the send/receive controlling unit 37. Thus, when a cell is input to the conversion controlling unit 16, in the period for the cell, the VPI/VCI of the input cell are sent as a read access address for the common conversion table 20 to the send/receive controlling unit 37. When an access to the common conversion table 20 is issued corresponding to a request received from the controlling unit of the switch system (CPR), in the period (2), an address (designated address or referenced address) and designated data designated by the controlling unit of the switch system (CPR) are sent to the send/receive controlling unit 37.

The send/receive controlling unit 37 accesses the common conversion table 20 corresponding to the address, data, and R/W access request. FIG. 12A shows a format of an access request sent from the send/receive controlling unit 37 to the common conversion table 20 for reading internal VPI/VCI from the common conversion table 20 for converting the header of an input cell. In FIG. 12A, "R/W bit" is fixed in a state that represents a read access. "Input VPI/VCI" are VPI/VCI extracted from the header of an input cell. "Line number" is a line number of a line connected to the conversion controlling unit 16 through the line terminating unit 12 shown in FIG. 7. For example, in the case of an access request sent from the conversion controlling unit #0 (16-0) to the common conversion table 20, "line number" is "0". Since each input line is accommodated by the line terminating unit 12, the "line number" matches the number identifying the line terminating unit (input port number).

FIG. 12B shows a format for an access request sent from the send/receive controlling unit 37 to the common conversion table 20 when the common conversion table 20 is accessed corresponding to a request received from the controlling unit of the switch system (CPR). In FIG. 12B, "R/W bit", "designated address or referenced address", and "designated data" are the same as those in the format of the access request sent from the controlling unit of the switch system (CPR).

An access request shown in FIG. 12A or 12B is output to the bus that connects the common conversion table 20 and the conversion controlling unit 16.

When the common conversion table 20 receives the access request shown in FIG. 12A, it reads internal VPI/VCI with a key of input VPI/VCI stored in the access request. When the common conversion table 20 receives an access request with "R/W bit" that represents a read access as shown in FIG. 12B, the conversion table 20 reads internal VPI/VCI with a key of the referenced address. As shown in FIG. 12C, the common conversion table 20 adds the line number of the conversion controlling unit 16 that has issued the access request to the internal VPI/VCI (read data) and outputs the resultant data to the bus that connects the common conversion table 20 and the conversion controlling unit 16.

When the common conversion table 20 receives an access request with "R/W bit" that represents a write access as shown in FIG. 12B, it writes designated data to an area corresponding to the designated address.

When the send/receive controlling unit 37 of the conversion controlling unit 16 receives data (shown in FIG. 12C) from the common conversion table 20 through the bus, if the line number stored in the data accords with the local line number, the send/receive controlling unit 37 accepts the data. The send/receive controlling unit 37 determines whether data read from the common conversion table 20 is data for converting the header of the input cell or data that is read corresponding to a request from the controlling unit of the switch system (CPR). When the send/receive controlling unit 37 receives data for converting the header information of the input cell, it sends the data to the header converting unit 43. The header converting unit 43 converts the header of the cell. In other words, the header converting unit 43 rewrites the VPI/VCI of the input cell to internal VPI/VCI read from the common conversion table 20. A cell that is input to the conversion controlling unit 16 is delayed by a delaying circuit 42 for a time period necessary for accessing the common conversion table 20, and is then sent to the header converting unit 43. When the send/receive controlling unit 37 receives data that is read corresponding to a request received from the controlling unit of the switch system (CPR), it sends the read data to the controlling unit of the switch system (CPR) through the controlling unit interface 32.

The access control for the common conversion table 20 performed by the conversion controlling unit 16 is summarized as follows.

The conversion controlling unit 16 performs a read access to the common conversion table 20 with input VPI/VCI stored in the header of an input cell and obtains the corresponding internal VPI/VCI.

When the controlling unit of the switch system (CPR) designates internal VPI/VCI to the common conversion table 20, the conversion controlling units 16 performs a write access to the common conversion table 20 with a designated address stored in an access request issued by the controlling unit of the switch system (CPR) and writes designated data to an area corresponding to the designated address.

When the controlling unit of the switch system (CPR) references the contents of the common conversion table 20, the conversion controlling unit 16 performs a read access to the common conversion table 20 with a reference address stored in an access request issued by the controlling unit of the switch system (CPR) and reads data (internal VPI/VCI) from an area corresponding to the referenced address.

In the above described embodiment, the internal VPI/VCI is described as 28-bit information, but it can be compressed into information shorter than 28 bits for an easier search.

Figure 9B:
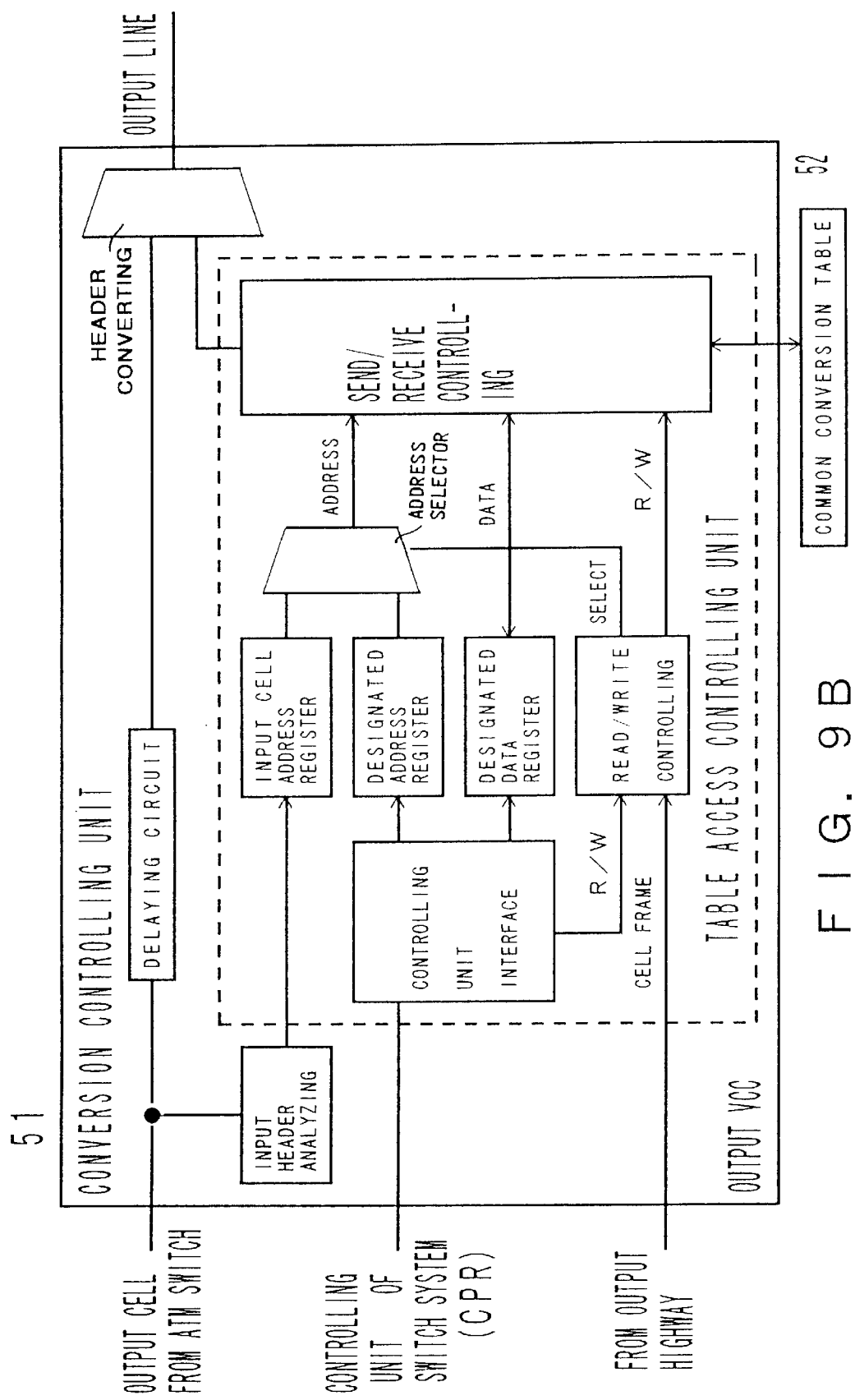
FIG. 9B is a block diagram showing a construction of a conversion controlling unit on the output side of the switch.

FIG. 9B shows the configuration of the conversion controlling unit (CNV) 51 provided in the line interface unit on the output side of the ATM switch. The configuration of the conversion controlling unit 51 is fundamentally the same as that of the conversion controlling unit 16. The conversion controlling unit 51 accesses the shared conversion table 52, converts the internal VPI/VCI stored in the header of the cell output from the ATM switch into an output VPI/VCI, and outputs it to the output line.

Next, an interface between a plurality of conversion controlling units 16 and a common conversion table 20 will be described. The following descriptions are also effective for the interface between the conversion controlling unit 51 and the shared conversion table 52.

Figure 13:
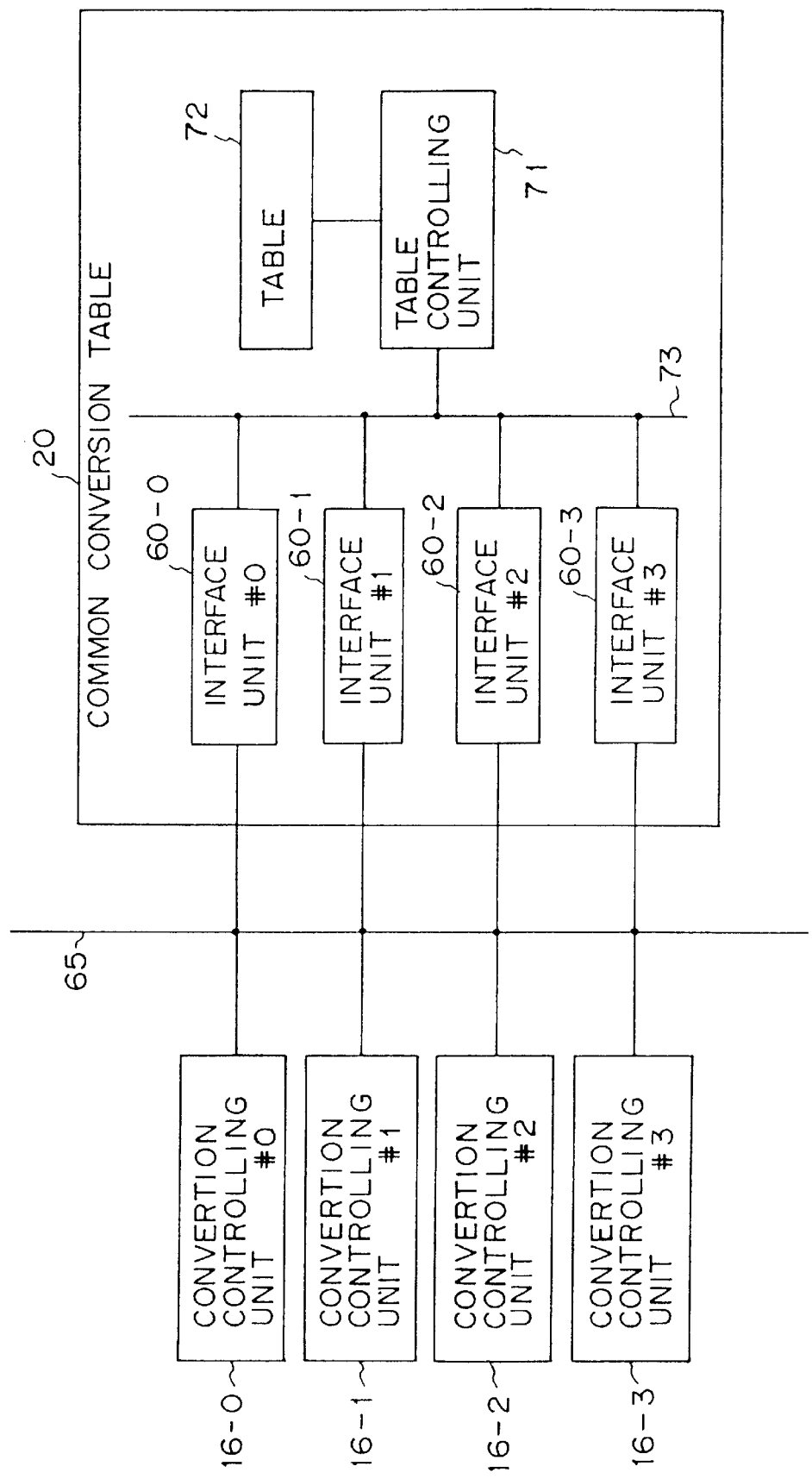
FIG. 13 is a block diagram for explaining an interface between the conversion controlling units and the common conversion table.

FIG. 13 is a block diagram for explaining an interface between a conversion controlling unit 16 and a common conversion table 20. Conversion controlling units #0 to #3 (16-0 to 16-3) are connected to a serial bus 65. The common conversion table 20 has interface units #0 to #3 (60-0 to 60-3) corresponding to the conversion controlling units #0 to #3 (16-0 to 16-3). The interface units #0 to #3 (60-0 to 60-3) are connected to the serial bus 65.

When the conversion controlling unit #0 (16-0) accesses the common conversion table 20, it outputs an access request as shown in FIG. 12A or 12B to the serial bus 65. "0" is designated as the line number to the access request. The access request is sent to the interface units #0 to #3 (60-0 to 60-3). However, since the line number is "0", the access request is accepted by only the interface unit #0 (60-0).

When the interface unit #0 (60-0) accepts the access request, a table controlling unit 71 determines that the interface unit #0 (60-0) has accepted the access request and accesses a table 72 corresponding to the access request. When the access request is a read access, the table controlling unit 71 sends data read from the table 72 to the interface unit #0 (60-0).

The interface unit #0 (60-0) generates data in a format shown in FIG. 12C and outputs the data to the serial bus 65. "0" is designated to the line number of the data. Although the data that is output from the interface unit #0 (60-0) is sent to the conversion controlling units #0 to #3 (16-0 to 16-3), since the line number of the data is "0", the data is accepted by only the conversion controlling unit #0 (16-0).

In such a manner, the conversion controlling unit #0 (16-0) accesses the common conversion table 20. Likewise, the conversion controlling units #1 to #3 (16-1 to 16-3) access the common conversion table 20.

In FIG. 13, the conversion controlling units #0 to #3 (16-0 to 16-3) are included in, for example, the common portion 14 of system 0 of the common portion 13 of the line interface unit 10. The common conversion table 20 shown in FIG. 13 is one of the common conversion table 21 of system 0 or the common conversion table 22 of system 1. In this example, the common conversion table 20 is the common conversion table 21 of system 0. In this case, the conversion controlling units #0 to #3 (16-0 to 16-3) of the common portion 14 of system 0 access the common conversion table 21 of system 0. On the other hand, the conversion controlling units #0 to #3 of the common portion 15 of system 1 access the common conversion table 22 of system 1.

Figure 14:
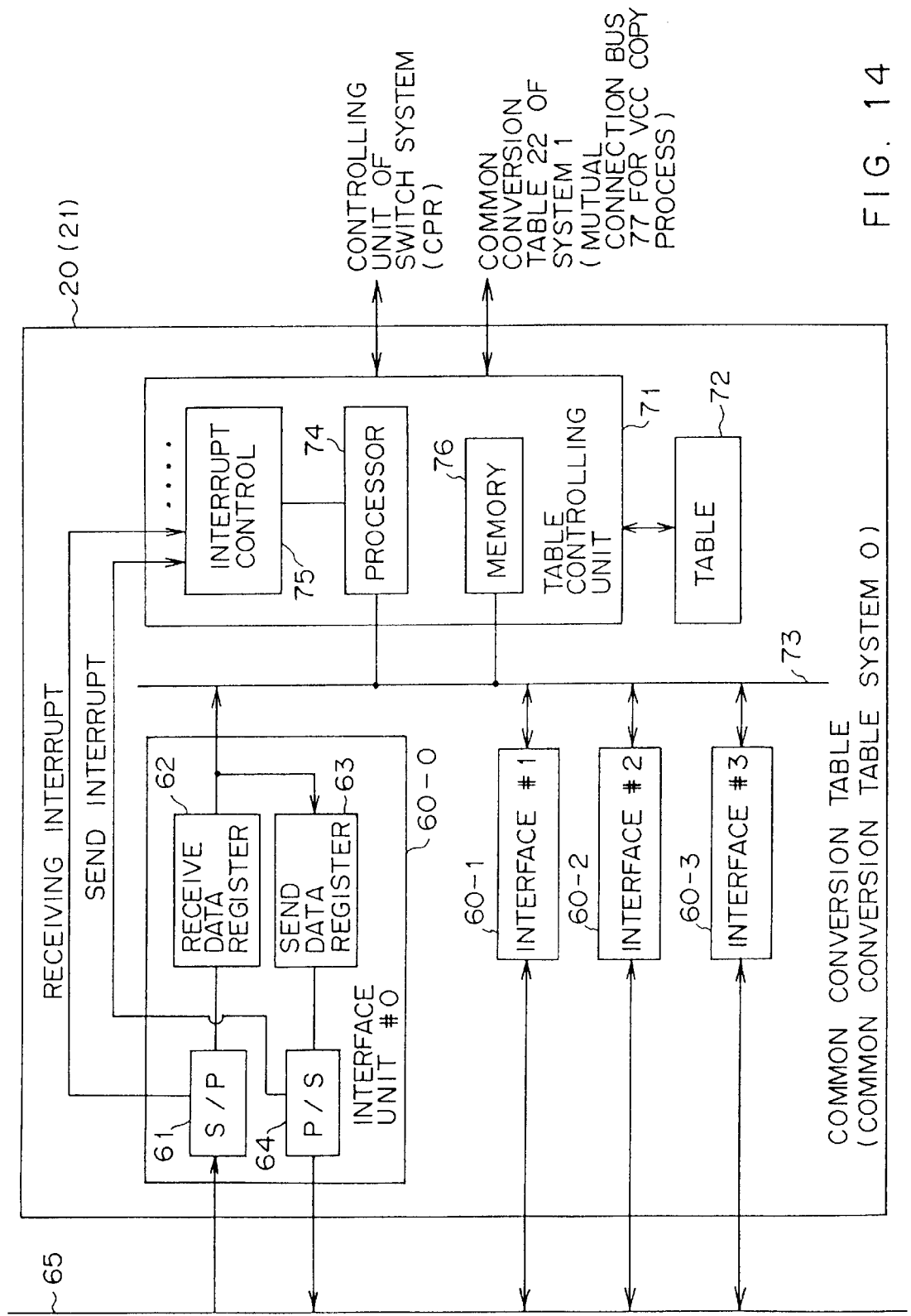
FIG. 14 is a block diagram showing a structure of the common conversion table corresponding to an embodiment of the present invention.

FIG. 14 is a block diagram showing a structure of the common conversion table 20.

The common conversion table 20 has four interfaces #0 to #3 (60-0 to 60-3) corresponding to the conversion controlling units #0 to #3 (16-0 to 16-3) (namely, lines #0 to #3). Since each of the interfaces #0 to #3 (60-0 to 60-3) basically performs the same operation, the operation of the interface #0 (60-0) will be exemplified.

When the interface #0 (60-0) receives data in the format shown in FIG. 12A or 12B from the conversion controlling units #0 to #3 (16-0 to 16-3) through a serial bus 65, it determines the "line number" of the data and accepts the data if the "line number" is "0". In other words, the interface #0 (60-0) accepts data that is output from the conversion controlling unit #0 (16-0).

A serial/parallel converting unit 61 converts the accepted receive data into a parallel format and stores it in a receive data register 62. In addition, the serial/parallel converting unit 61 sends a receive interrupt signal to a table controlling unit 71. The receive data register 62 is connected to a processor bus 73 that is controlled by a processor 74 of the table controlling unit 71. The processor 74 performs a read access for the receive data register 62. A send data register 63 and a parallel/serial converting unit 64 will be described later.

The table controlling unit 71 is a unit that performs a read/write access to a table 72 that stores output header information. The table controlling unit 71 retrieves header information from the table 72 with an address of input VPI/VCI (or designated address) received by the interfaces #0 to #3 (60-0 to 60-3) and sends the header information to the interfaces #0 to #3 (60-0 to 60-3).

The interrupt controlling unit 75 interrupts the processor 74 corresponding to an interrupt signal received from the interfaces #0 to #3 (60-0 to 60-3). When the interface #0 (60-0) sends a receive interrupt signal to the interrupt controlling unit 75, it interrupts the processor 74. With this interrupt, the processor 74 determines that the interface #0 has received data from the conversion controlling unit #0 (16-0) and reads data from the receive data register 62 of the interface #0 (60-0). In addition, the processor 74 accesses the table 72 corresponding to the input VPI/VCI (or designated address) of the data being read and extracts header information (internal VPI/VCI) from the table 72. Moreover, the processor 74 writes the header information (internal VPI/VCI) to the send data register 63 of the interface #0 (60-0). A memory 76 is a RAM, working area for the processor 74 that performs the above-described processes. In addition, the memory 76 is used as an index memory that accesses the table 72. The index memory will be described later.

The send data register 63 is connected to the processor bus 73. The send data register 63 stores header information (internal VPI/VCI) written by the processor 74 of the table controlling unit 71. A parallel/serial converting unit 64 converts data stored in the send data register 63 into serial data and sends the resultant data to the serial bus 65. After the serial data has been sent, the parallel/serial converting unit 64 performs a send interrupt for the processor 74 of the table controlling unit 71.

The table controlling unit 71 also interfaces with the controlling unit of the switch system (CPR) so as to add and delete data to/from the table 72. In other words, in the header converting function unit (VCC) according to the embodiment, data of the table 72 is rewritten through the conversion controlling unit 16. In addition, data can be rewritten by the controlling unit of the switch system (CPR) not through the conversion controlling unit 16. Moreover, the table controlling unit 71 interfaces with a table controlling unit of the other system unit of the duplicated system and performs a VCC copy process (that will be described later). In other words, when the common conversion table 20 shown in FIG. 14 is the common conversion table 21 of system 0, the table controlling unit 71 shown in FIG. 14 is connected to the table controlling unit 71 of the common conversion table 22 of system 1.

Next, a method for structuring a table that stores header information (internal VPIs/VCIs) will be described. In other words, the structure of the table 72 shown in FIG. 13 or 14 will be described.

The table 72 stores header information (internal VPIs/VCIs) for converting headers of cells that are input through a plurality of line interfaces. There will be a variety of hardware constructions for the table 72 (such as linearly addressed memory or a two-staged memory with an index memory). The table 72 can be freely designed corresponding to the scale of the ATM switch system. Next, a fixedly allocating system for fixedly allocating the storage area of the table 72 to individual line interfaces and a dynamically allocating system for dynamically varying the storage area of the table 72 corresponding to the use situations of the individual line interfaces and allocating a varied area to the line interfaces will be described.

FIGS. 15A and 15B are schematic diagrams for explaining a table structure according to the permanently allocating system.

In the permanently allocating system, as shown in FIG. 15A, the storage area of the table 72 is divided into units for a predetermined number of addresses which are permanently allocated to predetermined lines #n (in FIG. 7, #0 to #3). In this embodiment, the storage area of the table 72 is divided into blocks for every 32 addresses which are exclusively allocated to the lines #0 to #3. In this structure, the headers of cells for 32 types of input VPIs/VCIs can be converted for each line.

As shown in FIG. 15B, the table 72 has a data field with a length of 57 bits. The data field is composed of "set bit", "input header information", and "conversion information (output header information)". "Set bit" is a bit that is designated corresponding to an address of the table 72. "Set bit" represents whether or not valid information has been designated at a particular address. When valid information is stored at the particular address, "set bit" is "1". When "set bit" is "0", it represents that header information at the particular address has not been designated. When the table controlling unit 71 designates the header information to a particular address of the table 72, "1" is written to "set bit". When the designation is canceled (deleted), "0" is written to "set bit".

The data field of the conversion table 72 stores input header information and output header information as a set. The table controlling unit 71 retrieves a record of which input VPI/VCI of data read from the receive data register 62 accords with input header information in the data field. For example, when a cell is input from the line #0 and the interface #0 (60-0) generates a receive interrupt signal, the processor 74 of the table controlling unit 71 reads input VPI/VCI of the input cell stored in the receive data register of the interface #0 (60-0) and stores the input VPI/VCI to the memory 76 and then retrieves records from a storage region (address 0 to 1F) allocated to the line #0 from the conversion table 72. At this point, the processor 74 retrieves only records with the set bit that is "1" (representing that valid data is stored). Thus, the processor 74 extracts output header information of a record of which input VPI/VCI of the input cell accords with input VPI/VCI of the data field of the table 72. The output header information is internal VPI/VCI used for converting the header of the input cell and sent to the conversion controlling unit 16-0 through the interface #0 (60-0).

As described above, in the permanently allocating system, with input VPI/VCI of an input cell, the table is directly referenced and internal VPI/VCI are obtained. Thus, the processes performed by the processor 74 are simplified.

FIG. 16 is a schematic diagram for explaining a table structure corresponding to a first dynamically allocating system.

In the first dynamically allocating system, an index table is realized by the memory 76 of the table controlling unit 71. With the index table, a predetermined region of the table 72 is accessed. In this system, it is assumed that the common conversion table 20 is disposed for eight lines #0 to #7 and internal VPIs/VCIs for converting the headers of cells that are input from the eight lines #0 to #7 are stored in the table 72.

As shown in FIG. 16, in the first dynamically allocating system, the table 72 is divided into blocks whose number is larger than the number of input lines. For example, the table 72 is divided into 16 blocks for the eight input lines. Any blocks 0 to 15 of the table 72 are allocated to the input lines #0 to #7. In addition, if necessary, a plurality of blocks can be allocated to particular lines.

When blocks are allocated in the above-described system, since the relation between lines #0 to #7 and blocks 0 to 15 is not fixed, the relation is stored in an index table. Whenever the allocation is changed, the contents of the index table are rewritten.

The index table has 16-bit data fields for individual line numbers (cards) #0 to #7. Individual bits of the data fields accord with the blocks 0 to 15 of the table 72. In other words, the MSB of each data field accords with the block 15, whereas the LSB of each data field accords with the block 0. In the example shown in FIG. 16, three blocks 0, 8, and 9 of the table 72 are allocated to the line #0. In addition, the index table stores pointers to the individual blocks of the table 72. Thus, when the table 72 is accessed for converting the header of a cell that is input from the line #0, by referencing the index table, the pointers that represent the blocks 0, 8, and 9 can be obtained.

The data structure of the data stored in each block of the table 72 corresponding to the first dynamically allocating system is the same as the data format corresponding to the above-described permanently allocating system shown in FIG. 15. In other words, in the first dynamically allocating system, input header information and output header information are stored as a set. When blocks 0, 8, and 9 are allocated to the line #0, a set of the input VPI/VCI of the cell that is input from the line #0 and the internal VPI/VCI for converting the header of the cell is stored in one of the blocks 0, 8, and 9.

The size of each block in the first dynamically allocating system is smaller than that of each block shown in FIG. 15. It is assumed that each of the blocks 0 to 8 has eight records. Next, a method for allocating blocks will be described.

When a call is set, a set of input VPI/VCI and internal VPI/VCI corresponding thereto are written to the table 72 by the controlling unit of the switch system (CPR). When the call is disconnected, data written for the call is deleted. For example, in the case that the block 1 has been allocated to the line #1, when a call is newly set to the line #1, input VPI/VCI and internal VPI/VCI corresponding to the call are written to a blank record of the block 1. Since each block is composed of eight records, when eight or more calls are designated to the line #1, a non-use block (for example, the block 15) is allocated to the line #1.

In the case that a plurality of blocks are allocated to one line, when a call is disconnected and thereby the number of calls designated decreases, the arrangement of records is changed. In the case that the blocks 1 and 15 have been allocated to the line #1, when seven sets of input VPIs/VCIs and internal VPIs/VCIs are designated to the block 1 and one set of input VPI/VCI and internal VPI/VCI is designated to the block 15, the input VPI/VCI and internal VPI/VCI designated to the block 15 is written to the block 1.

Thereafter, the block 15 is released from the line #1 so that the block 15 can be allocated to another line. Thus, only the block 1 is allocated to the line #1.

Thus, in the first dynamically allocating system, blocks of the table 72 are allocated to individual lines corresponding to the use ratios thereof.

Next, an access operation for the table 72 corresponding to the first dynamically allocating system will be described. In this example, it is assumed that the table 72 is divided into 16 blocks and that each block has eight addresses (eight records). Then, a method for converting the header of a cell that is input from the line #0 will be described.

When a cell is input from the line #0, input VPI/VCI stored in the header of the cell are sent to the common conversion table 20 along with a read access request. In the common conversion table 20, the interface #0 (60-0) receives the data, stores the input VPI/VCI of the cell to the receive data register 62, and sends a receive interrupt signal to the processor 74. With the receive interrupt signal, the processor 74 reads input VPI/VCI from the receive data register 62 and stores them to the memory 76. Thereafter, the processor 74 reads blocks with the line number (card number) that is "0" from the index table. When the processor 74 determines that the set bit of the blocks 0, 8, and 9 is "1", it accesses the blocks 0, 8, and 9 of the table 72 and extracts internal VPIs/VCIs corresponding to the input VPIs/VCIs from the blocks 0, 8, and 9. A method for retrieving records from each block is the same as that of the permanently allocating system described with reference to FIG. 15. The internal VPIs/VCIs are sent to the conversion controlling unit #0 (16-0) through the interface #0 (60-0). The conversion controlling unit #0 (16-0) performs the header converting process for converting the input VPIs/VCIs into the internal VPIs/VCIs.

Next, the size (memory capacity) of the table 72 corresponding to the first dynamically allocating system will be described. Now, it is assumed that the average value and the maximum value of the numbers of VPIs/VCIs of cells (the numbers of calls designated at the same time) that are input from the lines #0 to #7 are known. In this case, as described above as the conventional system, in the construction in which tables for storing internal VPIs/VCIs are disposed for individual lines, to securely convert the headers of cells that are input from all the lines, considering that the number of VPIs/VCIs of cells that are input from any line may become the maximum, internal VPIs/VCIs corresponding to the maximum value should be stored to each table.

On the other hand, in the first dynamically allocating system, since blocks of the table 72 are allocated to individual lines, memory areas are not wastefully allocated to the individual lines. In addition, the situation in which the use ratios of all the lines (#0 to #7) rises is rare. Generally, lines with high use ratios and lines with low use ratios coexist. Thus, it is estimated that the total of the numbers of VPIs/VCIs of cells (the number of calls designated at the same time) that are input from the eight lines is the average value times 8. Thus, in the construction in which the table 72 is disposed for eight lines, the table 72 should have a storage capacity for storing internal VPIs/VCIs corresponding to the average value of the numbers of VPIs/VCIs times 8. Thus, the size (memory capacity) of the table 72 can be reduced.

FIGS. 17A, 17B, and 17C are schematic diagrams for explaining a table structure corresponding to a second dynamically allocating system.

As with the first dynamically allocating system, although the second dynamically allocating system is of a two-stage retrieving type, it uses a CAM (Contents Addressable Memory) in the first stage. In this system, the table 72 is not divided into a plurality of blocks. As shown in FIG. 17A, addresses of the CAM are collated with addresses of the table 72 in a one-to-one relation. The CAM is disposed in, for example, a memory 76.

In a data field of the CAM, "line number+input header information" is stored. As shown in FIG. 17B, "line number+input header information" is composed of a line number of four bits, an input VPI of 12 bits, and an input VCI of 16 bits. In this embodiment, four bits are allocated to identify a line number. Thus, the table is shared by up to 16 lines (namely, 16 conversion controlling units).

In a data field of the table 72, only conversion information is stored. As shown in FIG. 17C, the conversion information is composed of internal VPI/VCI used for converting the header of a cell. The data length of the conversion information is 28 bits.

Next, an operation for accessing the table 72 corresponding to the second dynamically allocating system will be described.

First of all, the case that the controlling unit of the switch system (CPR) designates conversion information to the table 72 will be described. In the following, information necessary for causing the input VPI/VCI (that are A/B, respectively) of a cell that is input from a line #X to be converted into internal VPI=C and internal VCI=D is designated to the table 72.

(1) A processor 74 of a table controlling unit 71 generates a data field corresponding to information received from the controlling unit of the switch system (CPR). In other words, the processor 74 generates data "XAB" where "X" is a line number and "AB" is input VPI/VCI.

(2) Data "XAB" is designated to the CAM. In other words, the data "XAB" is written to the CAM. The CAM designates the data "XAB" to a blank data field of the CAM and outputs the address of the data field. Now, it is assumed that the address is "2".

(3) The processor 74 designates conversion information received from the controlling unit of the switch system (CPR) to the data field with the address "2" of the table 72. In other words, the processor 74 writes data "CD" to the data field of the table 72 with the address "2".

Next, the case that the conversion controlling unit 16 extracts internal VPI/VCI from the table 72 for converting the header of an input cell will be described. In the following, a process for inputting a cell that has VPI/VCI (that are A/B, respectively) that are input from a line #X and extracting internal VPI/VCI from the table 72 for converting the header of the cell will be described.

(1) When the cell is input from the line #X, a conversion controlling unit #X (16-X) stores "AB" as the input VPI/VCI to data in the format shown in FIG. 12A and sends the data to the common conversion table 20. The interface #X (60-X) of the common conversion table 20 sends a receive interrupt signal to the processor 74 of the table controlling unit 71 so as to interrupt the processor 74.

(2) The processor 74 reads data stored in a receive data register 62 of the interface #X (60-X) and obtains input header information (input VPI/VCI that are A/B, respectively).

(3) The processor 74 generates a data field value for retrieving data from the CAM corresponding to the information obtained in step (2). In this example, the header of the cell that is input from the line #X is converted, and data "XAB" is generated.

(4) The processor 74 performs a read access for the CAM corresponding to the data "XAB". The CAM outputs the address of a data field that accords with the data "XAB". In this example, it is assumed that an address "2" is obtained.

(5) The processor 74 reads a data field with the address "2" from the table 72 and obtains output header information (internal VPI=C and internal VCI=D).

(6) The processor 74 designates the output header information obtained in the step (5) to a send data register 63 of the interface #X (60-X). The interface #X (60-X) sends the contents of the send data register 63 to the conversion controlling unit #X (16-X). After the contents of the send data register 63 have been sent, the interface #X (60-X) sends a send interrupt signal to the processor 74 so as to interrupt the processor 74.

(7) When the processor 74 receives the send interrupt, the processing of the common conversion table 20 is completed.

Thereafter, the conversion controlling unit #X (16) performs a header converting process for rewriting the VPI/VCI of the input cell to output header information (internal VPI=C and internal VCI=D) that is read from the table 72.

As described above, in the second dynamically allocating system, since the CAM is used and the addresses of the CAM are collated with the addresses of the table 72 in a one-to-one relation, when the processor 74 performs a retrieving process for output header information, it is not necessary to search the table 72. Thus, the process for extracting the output header information is speeded up. As described above, when the table 72 is composed corresponding to the first or second dynamically allocating system, even if the use ratios of individual lines (line interfaces) vary time by time, the storage area of the table 72 can be allocated to the lines corresponding to the use ratios. Thus, the non-use storage area allocated to any line decreases. Consequently, the memory size can be reduced in comparison with the conventional structure in which tables are disposed for individual lines. Since the storage area of the table is dynamically allocated, input header information received from individual conversion controlling units 16 cannot be used as addresses. In this case, the process for converting input header information into real addresses of the table is dedicatedly performed by the table controlling unit 71. Thus, since the common conversion table 20 is shared by individual lines, the use efficiency of the common conversion table can be improved in comparison with the conventional distributing construction.

In the above description of the embodiment, the header is converted on the input side of the ATM switch, but the conversion is performed similarly on the output side.

Next, a VCC copy process performed between the common conversion table 21 of system 0 and the common conversion table 22 of system 1 will be described.

As shown in FIG. 7, the common conversion table 20 is composed of the common conversion table 21 of system 0 and the common conversion table 22 of system 1. For example, in the case that the common conversion table 22 of system 1 is placed in the out-of-service state for maintenance, repair, replacement, or the like, and then restored to the in-service state so as to reconstruct a duplicated system, the contents of a table 72 (72-1) of the common conversion table 22 of system 1 does not accord with the contents of a table 72 (72-0) of the common conversion table 21 of system 0 (normally, the common conversion table 22 of system 1 is reset when it is in the out-of-service state). Thus, to match the contents of the table 72-0 of the common conversion table 21 of system 0 with the table 72-1 of the common conversion table 22 of system 1, a process for writing the contents of the table 72-0 to the table 72-1 is required. This process is referred to as a VCC copy process. In the following, a system for disconnecting and connecting a mutual connection bus disposed between both the systems and a system using a dual port memory will be described.

FIGS. 18A and 18B are block diagrams for explaining systems for connecting a table of system 0 and a table of system 1 with the mutual connection bus.

A common conversion table 21 of system 0 and a common conversion table 22 of system 1 are mutually connected by a mutual connection bus 77. In FIG. 18, both the systems have processors 74-0 and 74-1, respectively. The processor 74-0 and the table 72-0 are connected through a switch 78-0. The processor 74-1 and the table 72-1 are connected through a switch 78-1. Both the systems are connected through switches 79-0 and 79-1. These switches are opened and closed under the control of the controlling unit of the switch system (CPR).

FIG. 18A shows a normal state. In the normal state, the switches 78-0 and 78-1 are closed. The switches 79-0 and 79-1 are open. Thus, the tables 72-0 of system 0 and 72-1 of system 1 are controlled by the processors 74-0 and 74-1, respectively.

FIG. 18B shows a VCC copy state in which a VCC copy process is performed from the system 0 to the system 1. When the VCC copy process is performed from the system 0 to the system 1, the switches 78-0, 79-0, and 79-1 are closed. However, the switch 78-1 is open. In other words, the tables 72-0 of system 0 and 72-1 of system 1 are controlled by the processor 74-0 of system 0. The processor 74-0 of system 0 reads data from the table 72-0 of system 0 and writes the data to the table 72-1 of system 1 corresponding to a VCC copy start command received from the controlling unit of the switch system (CPR).

FIG. 19 is a block diagram for explaining a system for performing a VCC copy with a dual port memory between systems 0 and 1. In this system, a common conversion table 21 of system 0 and a common conversion table 22 of system 1 have dual port memories 80-0 and 80-1, respectively.

FIG. 19A shows a normal state. In the normal state, a processor 74-0 of system 0 and a processor 74-1 of system 1 access a table 72-0 of system 0 and a table 72-1 of system 1, not dual port memories 80-0 and 80-1, respectively.

FIG. 19B shows a VCC copy state in which the VCC copy process is performed from the system 0 to the system 1. When the VCC copy process is performed from the system 0 to the system 1, the processor 74-0 of system 0 and the processor 74-1 of system 1 perform the following processes corresponding to VCC copy start commands received from the controlling unit of the switch system (CPR). The processor 74-0 of system 0 reads data from the table 72-0 of system 0 and writes the data to the dual port memory 80-1 of system 1. On the other hand, the processor 74-1 of system 1 reads data from the dual port memory 80-1 of system 1 to the table 72-1 of system 1.

Thus, when the VCC copy process is performed corresponding to the common conversion table system according to the embodiment, the controlling unit of the switch system (CPR) only sends VCC copy start commands to the processors 74-0 and 74-1. The rest of the processes are performed by the processors 74-0 and 74-1 in the conversion tables 21 and 22 of the systems 0 and 1, respectively.

In addition, as shown in FIG. 7, since the common conversion table 20 is separated from the line interface unit 10, when the maintenance of the line interface unit 10 or when the repair/replacement of the common portion 14 of system 0 or the common portion 15 of system 1 is performed, since information stored in the common conversion table 21 of system 0 and information stored in the common conversion table 22 of system 1 are maintained, it is not necessary to perform the VCC copy process between the common conversion table 21 of system 0 and the common conversion table 22 of system 1. Generally, most causes for an out-of-service state of the line interface unit 10 do not directly relate to the common conversion table 20, such as expansion of a unit. Thus, since the VCC copy process is not required for such processes, the maintenance time for the entire switch system can be remarkably reduced.

In addition, as described above, when one common conversion table is disposed for a plurality of lines and the storage area of the table 72 is dynamically allocated to the lines, since the size of the table that stores the header conversion information is reduced, the VCC copy time can be shortened. Moreover, in the case that the VCC copy process is performed, when only records that store valid data are copied according to the set bits as shown in FIG. 15, rather than all data, the VCC copy process can be further reduced.

Figure 20A:
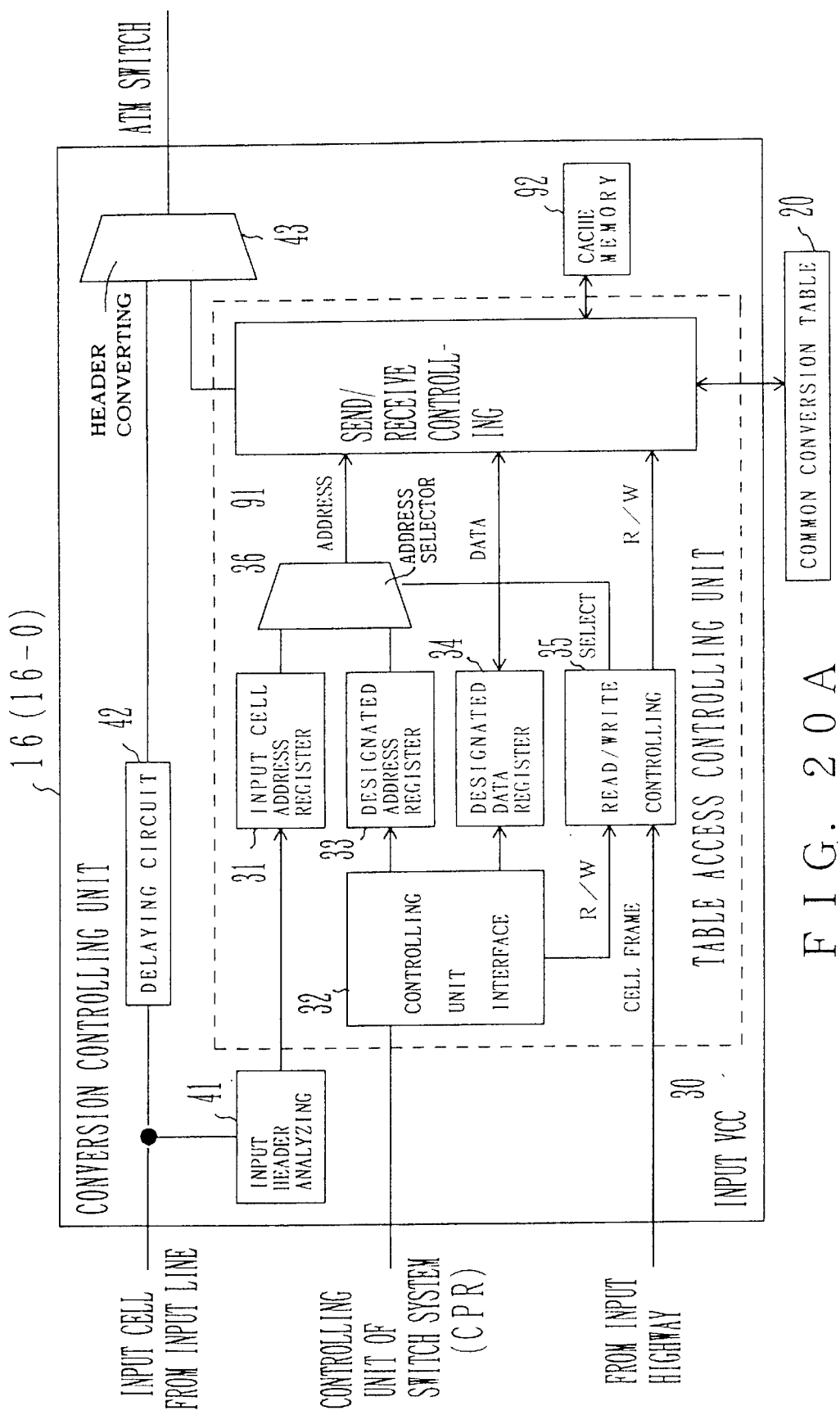
FIG. 20A is a block diagram showing a construction of a conversion controlling unit on the input side of the switch according to another embodiment of the present invention.

FIG. 20A shows the configuration of the conversion controlling unit 16 provided on the input side of the ATM switch according to another embodiment of the present invention. In FIGS. 9A and 20A, similar units to those in FIG. 9 are denoted by similar reference numerals.

In FIG. 20A, a send/receive controlling unit 91 performs an access controlling process for a cache memory 92 in addition to the function of the send/receive controlling unit 37 shown in FIG. 9A. The cache memory 92 is a memory with a much smaller storage capacity than a table 72 of a common conversion table 20. The cache memory 92 stores output header information that is read from the table 72.

Figure 21:
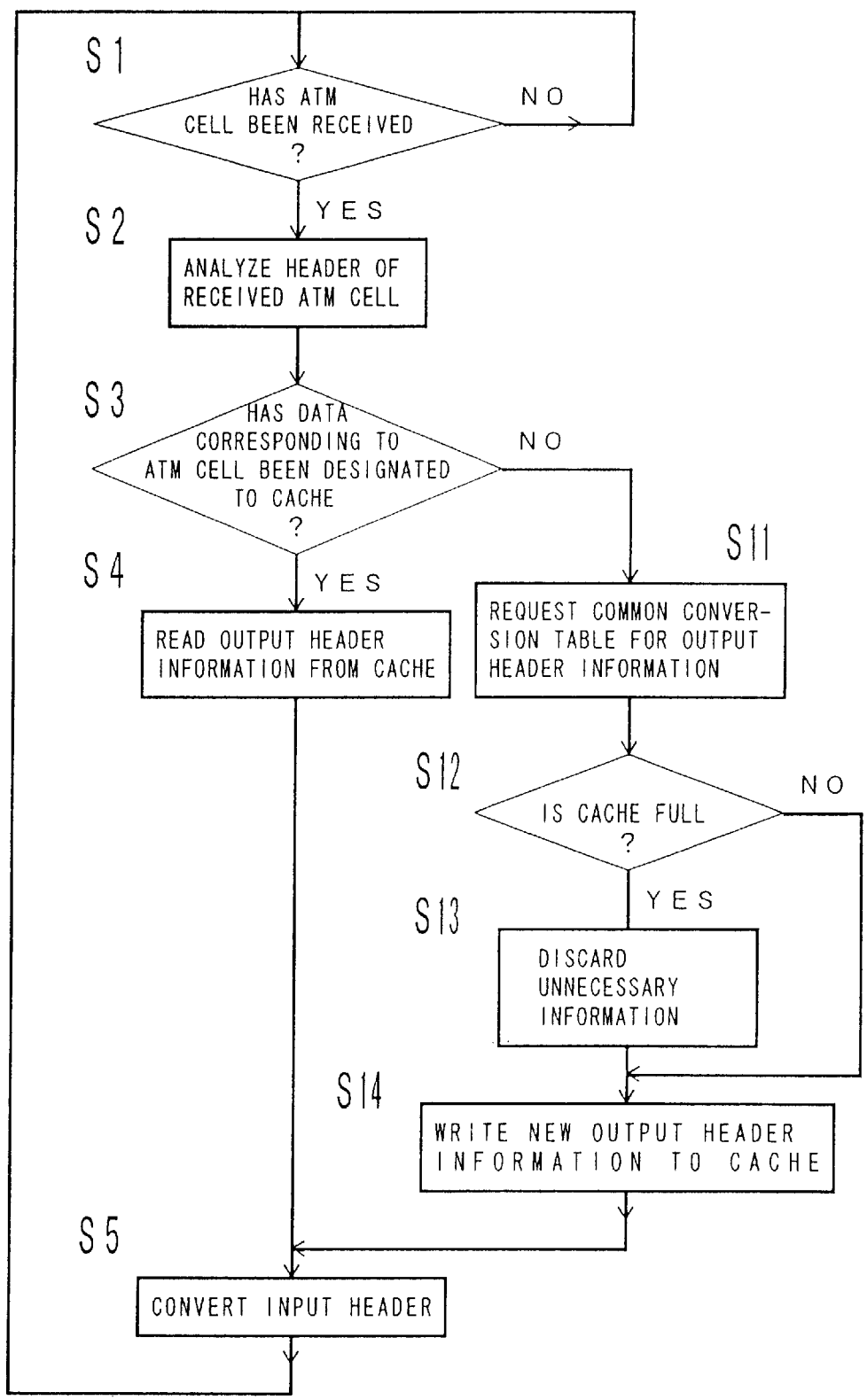
FIG. 21 is an operational flow chart of the conversion controlling unit shown in FIG. 20.

Next, with reference to a flow chart shown in FIG. 21, the operation of the conversion controlling unit 16 shown in FIG. 20A will be described.

At step S1, a send/receive controlling unit 91 waits until a cell is input from a line. When a cell has been input, the flow advances to step S2. At step S2, an input header analyzing unit 41 analyzes header information of the input cell and obtains input VPI/VCI. Thereafter, the flow advances to step S3. At step S3, the send/receive controlling unit 91 determines whether or not data corresponding to the input VPI/VCI is stored in a cache memory 92.

When data corresponding to input VPI/VCI is stored in the cache memory 92 (a cache hit takes place), the flow advances to step S4. At step S4, the send/receive controlling unit 91 extracts output header information (internal VPI/VCI) corresponding to the input VPI/VCI from the cache memory 92 and sends the output header information to a header converting unit 43. Thereafter, the flow advances to step S5. At step S5, the header converting unit 43 performs a header converting process for rewriting the input VPI/VCI of the header of the input cell to the internal VPI/VCI. Thereafter, the flow returns to step S1 so as to wait for the next input cell.

On the other hand, at step S3, when the send/receive controlling unit 91 has determined that the data corresponding to input VPI/VCI is not stored in the cache memory 92 (a cache miss takes place), the flow advances to step S11. At step S11, the send/receive controlling unit 91 reads output header information (internal VPI/VCI) from a common conversion table 20. Thereafter, the flow advances to step S12. At step S12, the send/receive controlling unit 91 determines whether or not the cache memory 92 has free space area. When the cache memory 92 does not have free space area, the flow advances to step S13. At step S13, part of the data stored in the cache memory 92 is discarded.

When the cache memory 92 has free space area, the send/receive controlling unit 91 skips the process of step S13. Thereafter, the flow advances to step S14. At step S14, the send/receive controlling unit 91 writes the output header information (internal VPI/VCI) read from the common conversion table 20 to the cache memory 92. Thereafter, the flow advances to step S5. At step S5, the header converting unit 43 performs the header converting process.

At step S13, as examples of algorithms for discarding data, a system in which information that was accessed at the oldest time, a system in which information is successively discarded from the top address of the cache memory 92, a system in which information is discarded at random, and a system in which least accessed data is discarded, are known.

As described above, since the cache memory 92 with a small storage capacity is disposed in the conversion controlling unit 16 of the line interface unit 10 shown in FIG. 20A and the output header information (internal VPI/VCI) is stored therein, when data necessary for the header converting process is stored in the cache memory 92, the common conversion table 20 is not accessed. Thus, the common conversion table 20 and the serial bus 65 that are shared with a plurality of lines can be prevented from becoming congested.

Since the capacity of the cache memory 92 is small, although of the number of output headers (internal VPIs/VCIs) stored is small, generally in the ATM system, cells with the same VPIs/VCIs tend to be successively input. Thus, the probability of which a cache hit takes place in the cache memory 92 is very high. Consequently, the common conversion table 20 is rarely congested.

As described above, since the common portion 13 of the line interface unit 10 is duplicated as the common portion 14 of system 0 and the common portion 15 of system 1, each of the common portion 14 of system 0 and the common portion 15 of system 1 has a conversion controlling unit 16 for the same line. Thus, the line interface unit 10 has the conversion controlling units of the systems 0 and 1. Each of the conversion controlling units of the systems 0 and 1 has a cache memory 92. When one of the common portion 14 of system 0 or the common portion 15 of system 1 is placed in an out-of-service state for repair, replacement, or the like, and then restored to the in-service state, the contents of the cache memory 92 are erased. However, the copy process is not performed between the cache memories 92 of the systems 0 and 1 so as to prevent the time required for restoring to the in-service state from increasing.

Figure 20B:
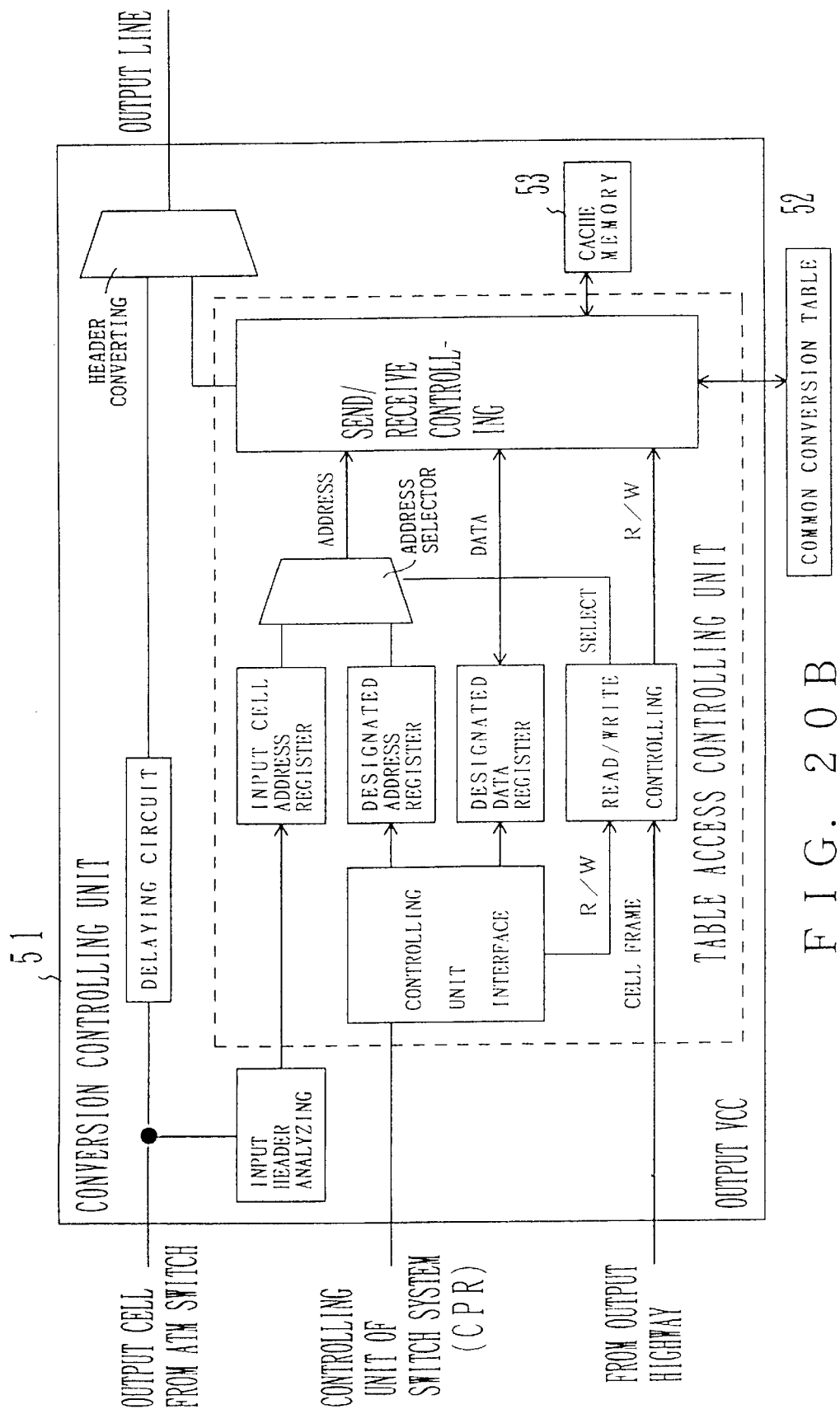
FIG. 20B is a block diagram showing a construction of a conversion controlling unit on the output side of the switch according to another embodiment of the present invention.

FIG. 20B shows the configuration of the conversion controlling unit 51 provided on the output side of the ATM switch according to another embodiment of the present invention. The configuration of the conversion controlling unit 51 shown in FIG. 20B is fundamentally the same as that of the conversion controlling unit 16 shown in FIG. 20A.

According to the present invention, since one table for storing information necessary for converting the header of a cell is disposed for a plurality of lines, the use efficiency of the table increases and the hardware size decreases. In addition, in such a construction, since the storage area of the table is allocated to individual lines corresponding to the use ratios thereof, the non-use storage area of the individual lines can be decreased. Thus, the use efficiency of the table is further improved. Consequently, the cost is reduced.

In the duplicated switch system, since the table is separate from the line interface unit, when the repair, replacement, or the like for the line interface unit is performed, it is not necessary to copy the contents of a table of one system to a table of the other system. Thus, the maintenance time for the system can be remarkably reduced.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A header converter, provided with a plurality of input ports receiving a fixed length packet, for converting a routing information in a header field of the fixed length packet having an information field and the header field, said header converter comprising:

a plurality of header analyzers, operatively connected to the input ports, for analyzing the header of the fixed length packet received at each of the input ports and extracting a first routing information from the header;

a conversion information store, accessed by each of said plurality of header analyzers, for collating the first routing information included in the header of the fixed length packet received at each of the input ports with a second routing information to be converted from the first routing information of the header; and a converter, operatively connected to at least one of said plurality of header analyzers, for converting the first routing information into the second routing information from said conversion information store and providing with the second routing information to the header field of the input fixed length packet.

2. The header converter as set forth in claim 1, wherein the first routing information extracted by each of said plurality of header analyzer is converted into a real address of said conversion information store.

3. The header converter as set forth in claim 1, wherein the first routing information extracted from the header of an input fixed-length packet and a port number that identifies an input port at which the input fixed-length packet is received is converted into an address of said conversion information store.

4. The header converter as set forth in claim 1, wherein a storage area of said conversion information store is dynamically allocated to each of input lines connected to the input ports corresponding to use ratios thereof.

5. The header converter as set forth in claim 1, wherein a storage area of said conversion information store is divided into a plurality of blocks and a predetermined number of the blocks are allocated to each of the input lines connected to the input ports corresponding to the use ratios thereof.

6. The header converter as set forth in claim 1, wherein said conversion information store has two tables that are a first table and a second table so as to duplicate said conversion information store, and wherein said conversion information store has a copy controlling unit for copying data stored in the first table to the second table.

7. The header converter as set forth in claim 6, wherein the copy controlling unit selectively copies only valid data stored in the first table to the second table.

8. The header converter as set forth in claim 1, further comprising a plurality of memories, provided for corresponding to each of said plurality of analyzers, for storing the second routing information extracted from said conversion information store, wherein each of said plurality of header analyzers accesses said plurality of memories corresponding to the first routing information extracted by each of said plurality of header analyzers and extracts the second routing information from the memory, and in the case that the second routing information corresponding to the first routing information is not stored in said plurality of memories, each of said plurality of header analyzer accesses said conversion information store.

9. The header converter as set forth in claim 8, wherein in the case that one of said plurality of header analyzers extracts second routing information from said conversion information store, the header analyzer stores the extracted second routing information in the corresponding memory.

10. The header converter as set forth in claim 9, wherein in the case that second routing information extracted from said conversion information store is stored in the memory and the memory does not have a free space area, the oldest second routing information that was accessed in the memory is discarded.

11. The header converter as set forth in claim 9, wherein in the case that second routing information extracted from said conversion information store is stored in the memory and the memory does not have a free space area, the second routing information is successively discarded from the top address of the memory.

12. The header converter as set forth in claim 8, wherein each of said plurality of header analyzers and said plurality of memories are duplicated for each of the input lines as a first system and a second system, and wherein in the case that the state of the first system is changed from an out-of-service state to an in-service state, data stored in said plurality of memories of the second system is not copied to said plurality of memories of the first system.

13. The header converter as set forth in claim 1, wherein said plurality of header analyzers and said conversion information store are connected with a bus.

14. The header converter as set forth in claim 1, wherein said plurality of header analyzers and said conversion information store are connected in a ring configuration.

15. A switching system, having a plurality of input ports for receiving a fixed length packet and a plurality of output ports for transmitting the fixed length packet, for routing the fixed length packet having an information field and a header field including a routing information in accordance with the routing information, comprising:

a plurality of header converters, each provided at one of the input ports and output ports, for converting a first routing information of the fixed length packet supplied at one of the input ports and output ports corresponding thereto; and a conversion information store, being accessible by said plurality of header converters, for storing a second routing information to be converted from the first routing information of the header of the supplied fixed length packet, wherein each of said plurality of header converters converts the first routing information into the second routing information obtained from said conversion information store.

16. The switching system as set forth in claim 15, wherein each of said plurality of header converter has a cache memory for storing information extracted from said conversion information store.

17. A header converting system for use with an ATM network, comprising:
 a plurality of header converting units, provided on an input side of an ATM switch, for converting routing information included in a header of a cell received from each of input lines; and
 a common conversion table, provided in common with said plurality of header converting units, for storing information to be used for converting the header of a cell corresponding to the routing information included in the header of the received cell,
 wherein each of said plurality of header converting units has a cache memory for storing routing information extracted from said common conversion table.

18. A header converting system for use with an ATM network, comprising:
 a plurality of header converting units, provided on an output side of an ATM switch, for converting routing information included in a header of a cell received from the ATM switch; and
 a common conversion table, provided in common with said plurality of header converting units, for storing information to be used for converting the header of a cell corresponding to the routing information included in the header of the received cell,
 wherein each of said plurality of header converting units has a cache memory for storing routing information extracted from said common conversion table.

19. A header converting method, for use with a switch system for switching a fixed-length packet having an information field and a header including routing information, for converting the header of the fixed-length packet, said method comprising the steps of:
 receiving fixed-length packets from a plurality of input lines by corresponding plurality of header converters;
 disposing a routing information conversion table in common with the plurality of header converters, the routing information conversion table storing information for converting routing information of a fixed-length packet;
 referencing by the plurality of header converters the routing information conversion table so as to rewrite the routing information included in the header of a fixed-length packet from the plurality of input lines; and
 sending the fixed-length packet, the routing information of the fixed-length packet having been rewritten, to a switch of the switch system.

20. A header converting method for converting routing information included in a header of a cell for use with an ATM network, said header converting method comprising the steps of:
 receiving cells from a plurality of input lines by corresponding plurality of header converters;
 disposing a routing information conversion table in common with the plurality of header converters, the routing information conversion table storing information for converting routing information of a cell;
 referencing by the plurality of header converters the routing information conversion table so as to rewrite the routing information included in the header of a cell from the plurality of input lines; and sending the cell of which the routing information has been rewritten to an ATM switch.

21. A header converting method, for use with a switch system for switching a fixed-length packet having an information field and a header including routing information of the information field, for converting the header of the fixed-length packet, said method comprising the steps of:
 receiving fixed-length packets from a plurality of input lines by corresponding plurality of header converters;
 disposing a routing information conversion table in common with the plurality of header converters, the routing information conversion table storing information for converting routing information of a fixed-length packet;
 referencing by the plurality of header converters the routing information conversion table so as to rewrite the routing information included in the header of a fixed-length packet from the plurality of input lines; and
 sending the fixed-length packet of which the routing information of the fixed-length packet has been rewritten, to the output lines.

22. A header converting method, for use with a switch system for switching a fixed-length packet having an information field and a header including routing information, for converting the header of the fixed-length packet, said method comprising the steps of:
 receiving fixed-length packets from a plurality of input ports by corresponding plurality of header converters;
 analyzing by the plurality of header converters the header of a fixed length packet received at each of the plurality of input ports receiving a fixed length packet and extracting a first routing information from the header;
 extracting a second routing information from a conversion information store, provided for the plurality of input ports, corresponding to the first routing information; and
 converting the first routing information into the second routing information.

23. A header converting method, for use with a switch system for switching a fixed-length packet having an information field and a header including routing information, the switch system including a switch and a plurality of output ports connected to the switch, for converting the header of the fixed length packet, said method comprising the steps of:
 receiving fixed-length packets from the switch by a plurality of header converters;
 analyzing by the plurality of header converters the header of a fixed length packet to be transmitted via the plurality of output ports and extracting a first routing information from the header;
 extracting the second routing information from a conversion information store, provided for the plurality of output ports, corresponding to the first routing information; and
 converting the first routing information into the second routing information.

24. A header converting system for use with an ATM network, comprising:
 a plurality of header converting units, provided on an input side of an ATM switch, for converting routing information included in a header of a cell received from each of input lines; and
 a common conversion table, provided in common with said plurality of header converting units, for storing information to be used for converting the header of a cell corresponding to the routing information included in the header of the received cell, wherein each of said plurality of header converter units converts the routing information stored in the received cell into the information obtained from said common conversion table.

25. A header converting system for use with an ATM network, comprising:

a plurality of header converting units, provided on an output side of an ATM switch, for converting routing information included in a header of a cell received from the ATM switch; and a common conversion table, provided in common with said plurality of header converting units, for storing information to be used for converting the header of a cell corresponding to the routing information included in the header of the received cell, wherein each of said plurality of header converting units converts the routing information into the information obtained from said common conversion table.

* * * * *